US007617974B2

(12) United States Patent
Vandyck et al.

(10) Patent No.: US 7,617,974 B2
(45) Date of Patent: Nov. 17, 2009

(54) AUTOMATIC GATE AND ASSOCIATED METHOD FOR PERMITTING OR PREVENTING ACCESS

(75) Inventors: Daniel Vandyck, Nivelles (BE); François Royen, Waremme (BE); Hervé Gosselin, Thorembais les Beguines (BE)

(73) Assignee: Automatic Systems, Wavre (BE)

(*) Notice: Subject to any disclaimer, the term of this patent is extended or adjusted under 35 U.S.C. 154(b) by 81 days.

(21) Appl. No.: 10/541,326

(22) PCT Filed: Dec. 26, 2003

(86) PCT No.: PCT/EP03/15045

§ 371 (c)(1),
(2), (4) Date: Jan. 9, 2006

(87) PCT Pub. No.: WO2004/059591

PCT Pub. Date: Jul. 15, 2004

(65) Prior Publication Data

US 2006/0101716 A1 May 18, 2006

(30) Foreign Application Priority Data

Dec. 31, 2002 (FR) .................................. 02 16898

(51) Int. Cl.
*G06K 5/00* (2006.01)

(52) U.S. Cl. ........................... 235/382; 235/381; 49/35

(58) Field of Classification Search ................. 235/375, 235/382, 384, 440, 482, 381; 49/25, 35, 49/118, 141, 156
See application file for complete search history.

(56) References Cited

U.S. PATENT DOCUMENTS

| | | | | |
|---|---|---|---|---|
| 3,478,467 | A | | 11/1969 | May |
| 3,606,698 | A | | 9/1971 | Tanaka et al. |
| 3,742,647 | A | * | 7/1973 | Tomita .......................... 49/35 |
| 4,918,298 | A | | 4/1990 | Tanabe et al. |
| 4,929,821 | A | | 5/1990 | Kocznar et al. |
| 5,010,240 | A | | 4/1991 | Sheldon |
| 5,043,561 | A | * | 8/1991 | Kimata ....................... 235/384 |
| 5,105,369 | A | * | 4/1992 | Nelson .................... 250/201.4 |
| 5,333,410 | A | | 8/1994 | Tetherton |
| 6,450,404 | B1 | * | 9/2002 | Imazuka ..................... 235/381 |

FOREIGN PATENT DOCUMENTS

| | | |
|---|---|---|
| CA | 1 184 658 | 3/1985 |

(Continued)

*Primary Examiner*—Daniel A Hess
*Assistant Examiner*—Rafferty Kelly
(74) *Attorney, Agent, or Firm*—Young & Thompson

(57) ABSTRACT

Gate (1) including a vertical extended frame (2); at least one flap (3) which may be displaced between a closed position in which the flap prevents the passage of a person and an open position in which the flap permits the passage, elements for reading an access ticket, elements for controlling the displacement of the flap between the two positions, a lateral face to the frame (2), adjacent to the passage for the person provided with at least two rows of detector cells (C1-C33) cooperating with elements for preventing the opening of the flap when the cells detect an abnormal situation, one row of which extends to both sides of the flap above a line (L) situated at the mid-height of the frame and the other row is located close to the line.

49 Claims, 18 Drawing Sheets

FOREIGN PATENT DOCUMENTS

| | | | |
|---|---|---|---|
| EP | 0 335 229 | | 10/1989 |
| EP | 0 437 757 | | 7/1991 |
| FR | 2694648 | | 2/1994 |
| GB | 1 241 376 | | 8/1971 |
| JP | 01066794 | | 3/1989 |
| WO | WO 96/34367 | | 10/1996 |
| WO | WO 9634367 | A1 * | 10/1996 |

* cited by examiner

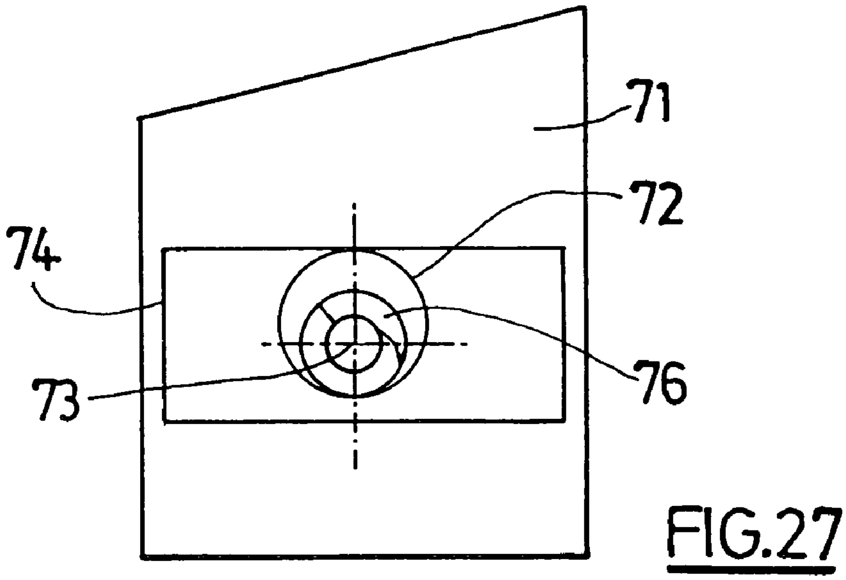
FIG.27
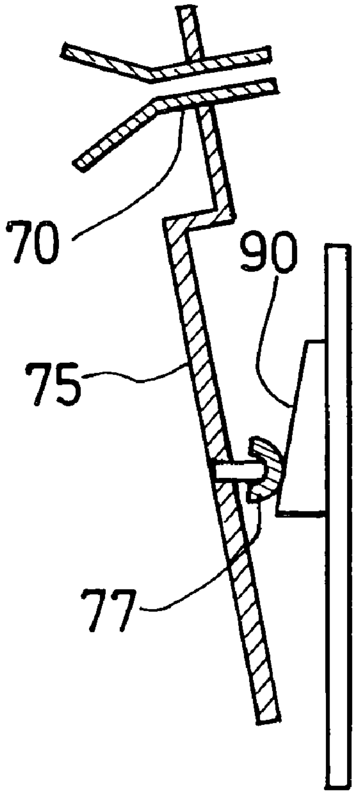
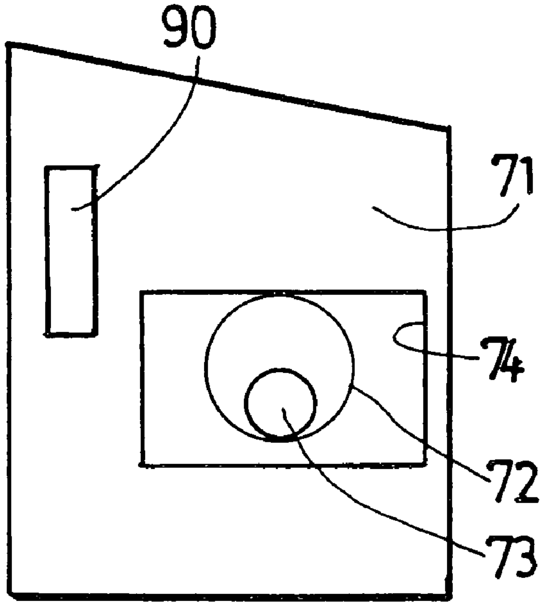
FIG.29
FIG.28

AUTOMATIC GATE AND ASSOCIATED METHOD FOR PERMITTING OR PREVENTING ACCESS

FIELD OF THE INVENTION

The present invention relates to an automatic gate for permitting or preventing access to a space or a transport vehicle, in particular to a boarding lounge or an aeroplane.

Generally the invention applies to access to boarding lounges, boats, aeroplanes or any means of public transport or to buildings, access to airlines' lounges in airports, and to duty-free zones.

BACKGROUND OF THE INVENTION

The most conventional solutions are three bars turnstiles controlled by the reading of a valid transport ticket.

Low gates with mobile, sliding, revolving or swinging glass flaps are also known.

The main drawbacks of these known solutions are the following:

The speed of release of passage is very slow with these different systems as the masses in movement are considerable and the inertia to be overcome is high.

In the case of three bars turnstiles, the turnstile is moved manually and the bars of the turnstile permanently obstruct the passage, annoying passengers, in particular if they have luggage.

In revolving-gate systems, the gate occupies a large space which cannot be used for detection equipment.

The systems with a glass obstacle are fragile i.e. they cannot withstand impacts.

Current systems have a low reliability level as the obstacle can inhibit detection of the user's advance. It is difficult to carry out passage detection at different heights.

The fact that the ticket is recovered before passing the obstacle does not guarantee that the person has actually passed through.

Moreover, this recovery does not invite the person to pass through, as the turnstile remains static unless the person makes a movement to open it himself.

SUMMARY OF THE INVENTION

The purpose of the present invention is to remedy the drawbacks of the above known solutions.

The invention thus relates to an automatic gate for permitting or preventing access by a person to a space or a transport vehicle, in particular to a boarding lounge or an aeroplane, comprising at least one vertical and elongated frame constituting a closed box, the gate comprising at least one flap which is mobile between a closed position in which this flap forms a barrier preventing the passage of a person along the frame, the end upstream of the frame relative to the person's direction of movement, comprising an input slot for an access ticket and the end downstream of the frame comprising an output slot for this ticket, the frame including means for controlling the displacement of the flap between the two abovementioned positions, a route for displacement of the ticket between said input slot and said output slot for the ticket and means for reading the ticket.

According to the invention, this gate is characterized in that it comprises means preventing the person from accessing the output slot in order to remove the ticket, when the flap is in the position preventing the passage of the person.

According to a preferred version of the invention, this automatic gate is characterized in that the distance between the flap and the ticket output is such that when the flap is in the position preventing the passage of a passenger, the latter cannot access said ticket output in order to remove the ticket.

This distance must be greater than an arm's length for a tall passenger plus a certain distance taking into account the fact of the passenger being able to lean over and turn his shoulders in order to attempt to recover the ticket.

The invention thus makes it possible to avoid any risk that a passenger can commit fraud by recovering his ticket before the opening of the flap.

According to an advantageous embodiment of the invention, the flap is integral with the frame.

According to a particular version of the invention, the flap is mounted in rotation about an approximately horizontal axis extending in the direction of the length of the frame.

According to a preferred version, in the position preventing the passage of the person, the flap has a part projecting out of the frame having the shape of a sector of a circle, the circular edge of this sector being directed upwards.

This shape makes it possible to constitute an obstacle preventing passage whilst allowing the flap to be completely retracted in the gate's opening position.

Preferably, the means for controlling the displacement of the flap are constituted by the reading of a valid ticket, allowing the displacement of said flap.

Preferably also, the lateral face of the frame adjacent to the passage of the person comprises detector cells cooperating with means preventing the opening of the flap when these cells detect an abnormal situation.

According to an advantageous version of the invention:

- said cells comprise at least two superposed rows of cells, one of the rows extending to both sides of the flap above a line situated at the mid-height of the frame and the other row being situated close to this line,
- said cells comprise three superposed rows of cells, one of the rows extending to both sides of the flap above a line situated at the mid-height of the frame, a second row being situated close to this line and a third row being situated below this line,
- said cells comprise at least three groups of cells, each of these groups being assigned to different detection functions,
- a first group of cells is assigned to a detection function ensuring the person's safety, a second group of cells is assigned to a detection function in order to allow counting of the persons and a third group is assigned to a function of detection of non-authorized and/or fraudulent passages,
- at least one cell can belong simultaneously to two groups of cells in order to perform different functions depending on the group of cells to which said cell is assigned,
- the cells in the upper row comprised between the frame entry end and the flap are suitable for detecting the entry of an adult person and optionally of two or more persons in close proximity,
- the cells in the middle row comprised between the flap and the frame exit end are suitable for detecting the exit of a person after the opening of the flap,
- the cells in the lower row comprised between the frame entry end and the flap are suitable for detecting the entry of a child,
- the detection of an adult pulling a trolley is carried out by the combination of at least one covered cell in the upper row simultaneously with the covering of at least two covered cells in the lower row, separated by a non-covered cell, the cells situated close to the flap are assigned to the safety of the person vis-à-vis the ill-timed closing of the flap, the cells in the upper or middle rows, situated downstream of the flap are suitable for detecting the passage of a person or of a child from downstream to upstream of the gate and for controlling the closing of the flap in order to prevent said person from turning back.

According to a preferred embodiment of the invention, the frame contains a microcomputer suitable for receiving information from an external central control station, a reader for the ticket introduced into the input slot of the frame, and detector cells and in order to control, via an automaton and a frequency variator, the operation of an electric motor for displacing the flap towards the opening or closing positions.

Other characteristics and advantages of the invention will also become apparent from the following description.

BRIEF DESCRIPTION OF THE DRAWINGS

In the attached drawings, given as non-limitative examples:

FIG. 27 is a plan view of the cutting blade and of the cams carried by the shaft of the electric motor, FIG. 28 is a plan view of the cutting blade showing a variant of the control means of this blade and of the guide support, FIG. 29 is a diagrammatic cross-section view of the guide support and the cutting blade.

DETAILED DESCRIPTION OF THE PREFERRED EMBODIMENTS

Figure 1:
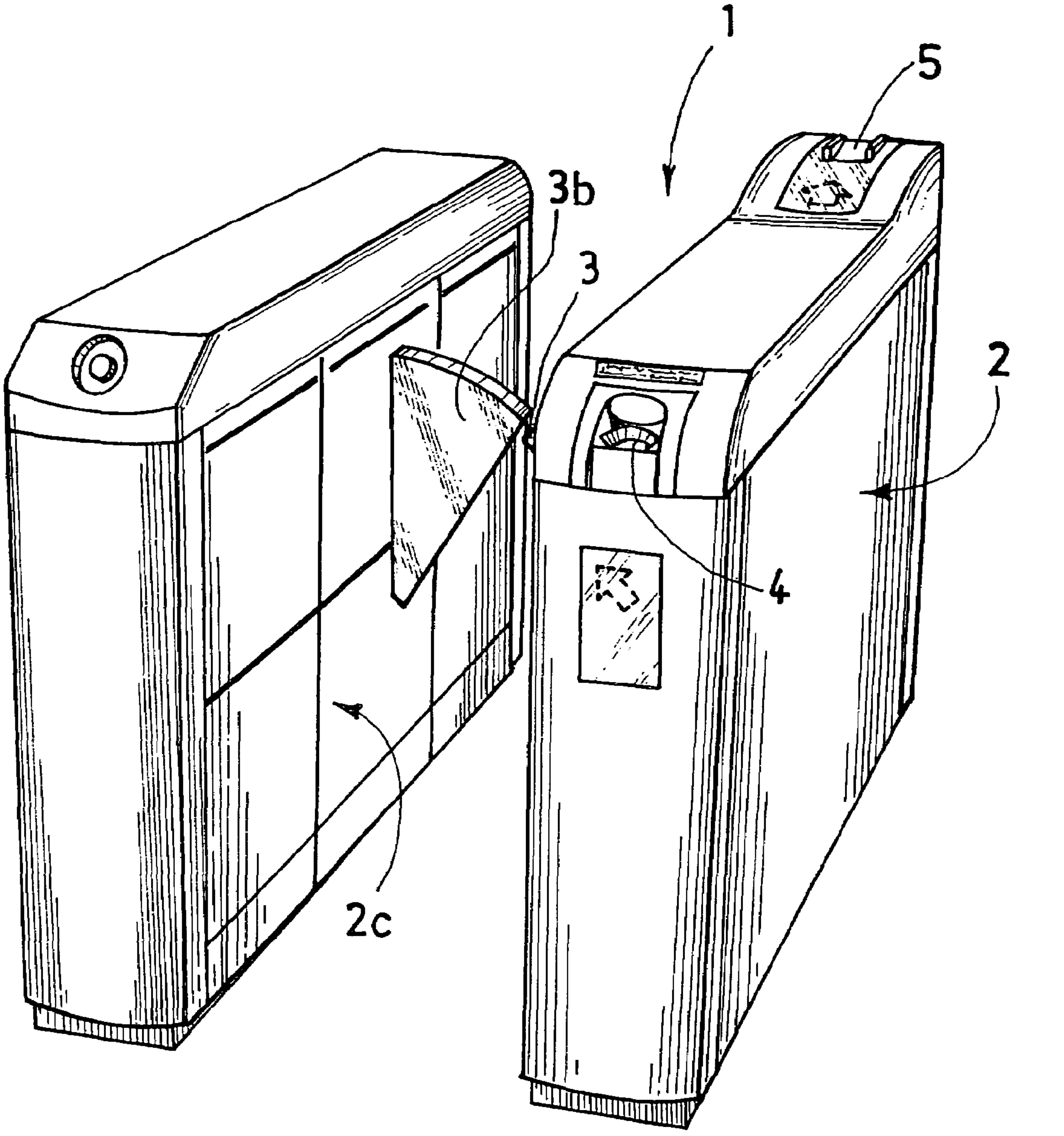
FIG. 1 is a perspective view of an automatic gate according to the invention.

In the embodiment represented in FIGS. 1 to 5, the automatic gate 1 for permitting or preventing access to a space or a transport vehicle, in particular to a boarding lounge or an aeroplane, comprises a vertical and elongated frame 2 constituting a closed box in the shape of a parallelepiped. This frame 2 carries a flap 3 which is mobile between a closed position (see FIG. 5) in which this flap 3 forms a barrier preventing the passage of a passenger along the frame 2 and an open position in which the flap 3 allows this passage.

The upstream end of the frame 2 relative to the direction of movement of the passenger comprises, close to the upper face of the frame, an input slot 4 for an access ticket and the downstream end of the frame 2 comprises, on the upper face of the frame, an output slot 5 for this ticket. The frame 2 contains means which are described in detail hereafter for controlling the displacement of the flap 3 between the two abovementioned positions. The frame 2 moreover comprises, at its upper part, a conveyance route 6 for the ticket between the input 4 and the output 5 of the ticket and ticket reading means.

In the example represented, the distance d (see FIG. 3) between the flap 3 and the ticket output slot 5 is such that, when the flap 3 is in the position preventing the passage of a passenger, the latter cannot access said ticket output 5 in order to remove the ticket.

Figure 5:
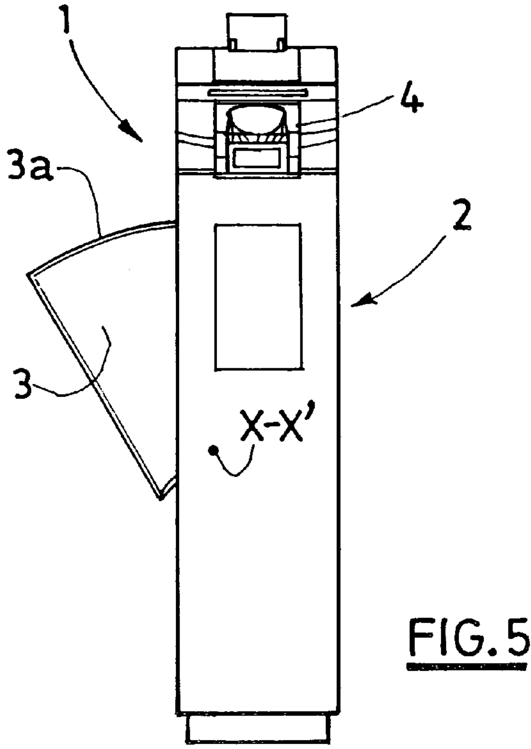
FIG. 5 is an elevational view of the front end of the automatic gate, the flap being in the closed position.

As shown by FIGS. 1 and 5, the flap 3 is integral with the frame 2 and is mounted in rotation about an approximately horizontal axis X-X' extending in the direction of the length of the frame 2.

Moreover, in the position preventing the passage of the passenger, the flap 3 has a part projecting out of the frame 2 having the shape of a sector of a circle, the circular edge 3*a* of this sector being directed upwards, as indicated in FIG. 5.

The means for controlling the displacement of the flap 3 are constituted by the reading of a valid ticket, authorizing the displacement of said flap 3.

Figure 2:
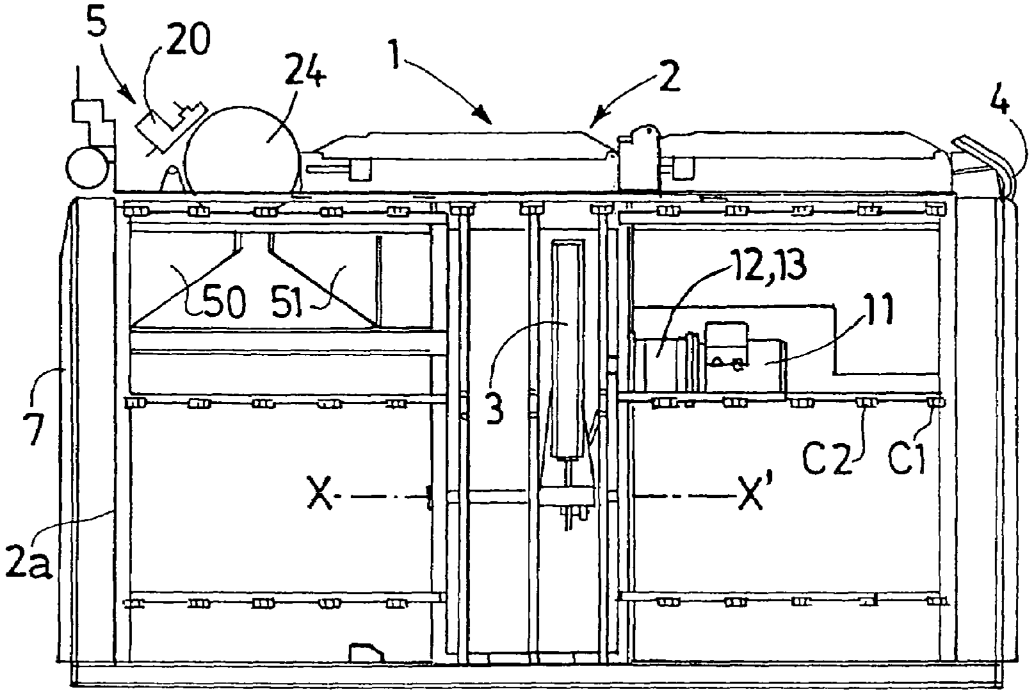
FIG. 2 is an elevational view, after removal of the side panels and top covers, of the automatic gate according to the invention.
Figure 3:
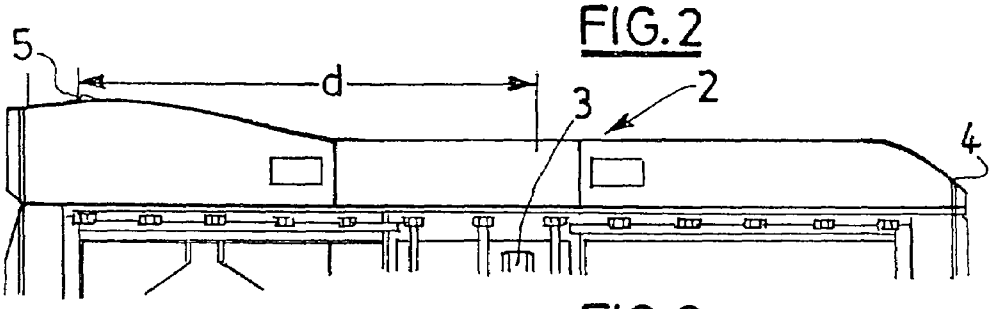
FIG. 3 is a partial view of the automatic gate, the top covers being in place.
Figure 4:
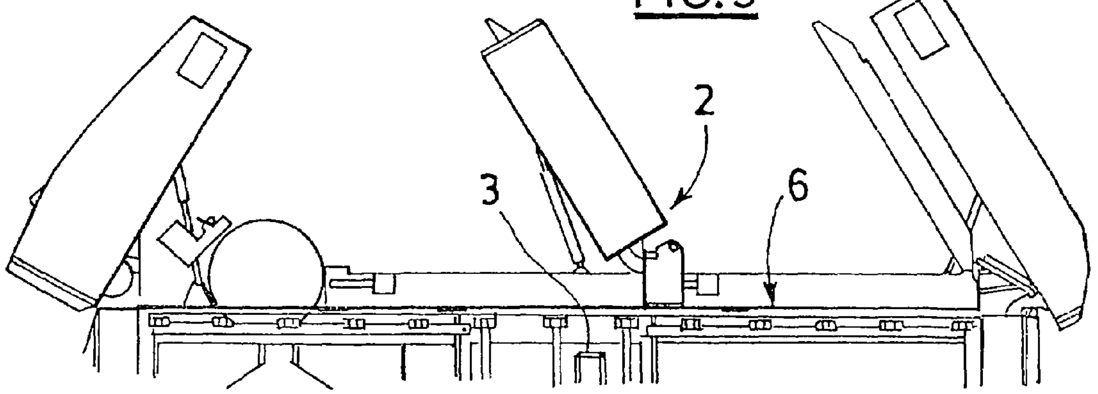
FIG. 4 is a view analogous to FIG. 3, the top covers being open.
Figure 6:
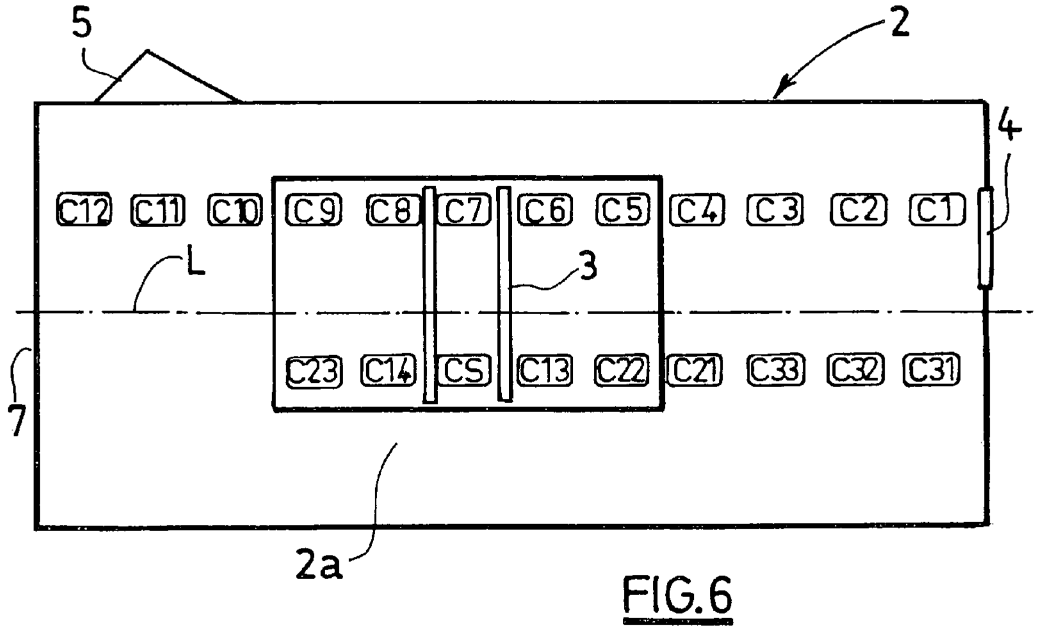
FIG. 6 is a diagrammatic view of a lateral-face of the automatic gate showing the location of the detector cells.
Figure 7:
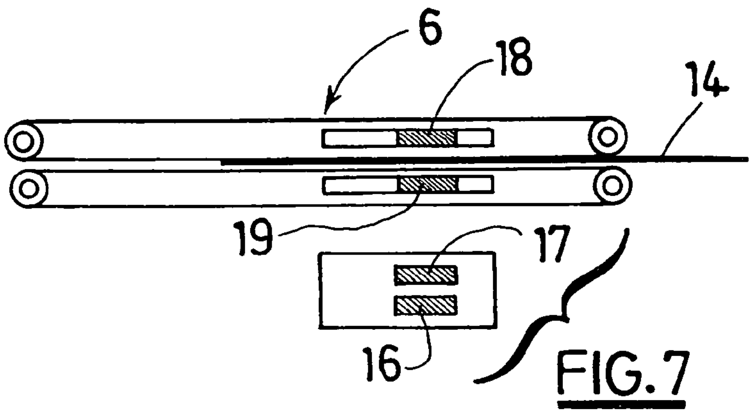
FIG. 7 is a diagrammatic view showing a ticket in position between two belt conveyors and the reading heads of the reader.

As can be seen in FIGS. 2 and 6, the lateral face 2*a* of the frame 2 adjacent to the passage of the passenger comprises detector cells C1, C2, . . . C33 cooperating with means preventing the opening of the flap 3, when these cells detect an abnormal situation.

In the case of FIG. 2, there are three rows of cells. In the case of FIG. 6, the lateral face 2*a* of the frame 2 carries two superposed rows of cells. The upper row of cells C1 to C12 extends to both sides of the flap 3 above the line L situated at the mid-height of the frame 2 and the other row comprising the cells C23 to C31 is situated close to this line.

In another embodiment, the cells C1, C2 . . . C33 include three superposed rows of cells, one of the rows extending to both sides of the flap 3 above a line L situated at the mid-height of the frame 2, a second row being situated close to this line L and a third row being situated below this line L.

The above cells comprise at least three groups of cells, each of these groups being assigned to different detection functions.

A first group of cells is assigned to a detection function ensuring the passenger's safety, a second group of cells is assigned to a detection function in order to allow counting of the passengers and a third group is assigned to a function of detection of non-authorized and/or fraudulent passages.

At least one cell can belong simultaneously to two groups of cells in order to perform different functions depending on the group of cells to which said cell is assigned.

The cells C1 to C8 in the upper row comprised between the frame entry end 4 and the flap 3 are suitable for detecting the entry of an adult passenger and optionally of two or more passengers in close proximity.

The cells in the middle row comprised between the flap 3 and the exit end 7 of the frame 2 are suitable for detecting the exit of a passenger after the opening of the flap 3.

The cells in the lower row comprised between the frame entry end 4 and the flap 3 are suitable for detecting the entry of a child.

The detection of an adult pulling a trolley is carried out by the combination of at least one covered cell in the upper row simultaneously with the covering of at least two covered cells in the lower row, separated by a non-covered cell.

The cells situated close to the flap 3 are assigned to the safety of the passenger vis-à-vis the ill-timed closing of the flap.

The cells in the upper or middle rows, situated downstream of the flap are suitable for detecting the passage of a person or a child from downstream to upstream of the gate and to control the closing of the flap in order to prevent said person from turning back.

Figure 9:
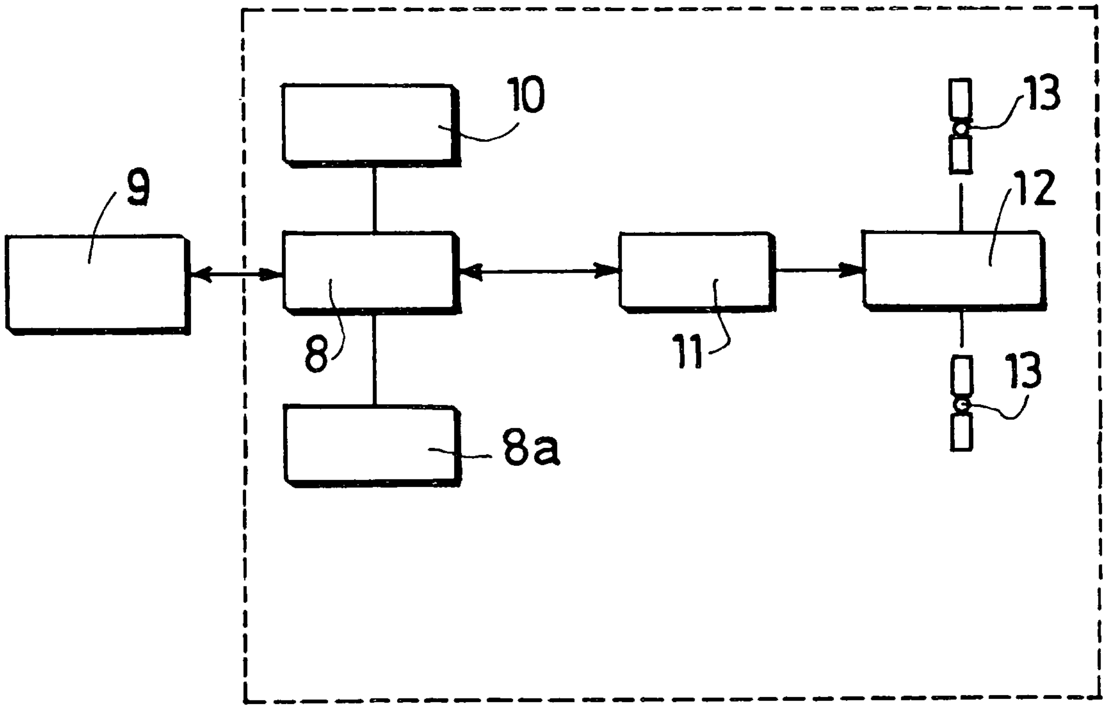
FIG. 9 is a diagram showing the different control elements of the automatic gate.

The frame 2 contains (see FIG. 9) a microcomputer 8 suitable for receiving information from an external central control station 9, a reader 10 of the ticket introduced into the input slot 4 in the frame, and detector cells C1 . . . C33. The microcomputer 8 also controls, via an automaton 11 and a frequency variator 12, the operation of an electric motor 13 for displacing the flap 3, or a second flap, towards the open or closed positions.

The microcomputer 8 also receives information 8*a* from the cells, from motors 13 and from various modules contained in the frame 2 which are described in detail hereafter.

Figure 8:
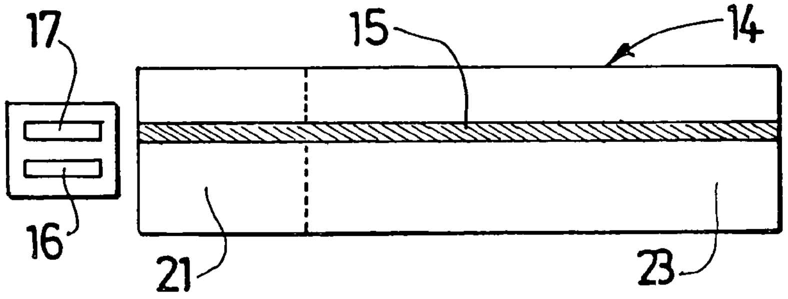
FIG. 8 is a plan view showing a ticket and a reader.

As shown in FIG. 8, the ticket 14 comprises a magnetic strip 15. The frame 2 contains four heads 16, 17, 18 and 19 for reading this magnetic strip, capable of reading the latter, whatever the position in which the ticket is introduced into the input 4.

The device can also operate with two reading heads for the same face of the ticket. In this case, when the magnetic strip 15 is not situated in alignment with one of the two reading heads, the ticket is directed towards a turning over module 24 for turning it over, then sending it back towards the reading heads.

Moreover, the frame 2 also comprises close to the ticket output end 7, a module 20 for cutting the ticket and detaching from the latter a coupon 21 (see FIG. 8) intended to be removed by the passenger, and one or two stores 50, 51 (see FIG. 2) for recovering the remaining part 23 of the ticket.

On the other hand, the frame 2 comprises between the displacement route 6 of the ticket and the module 20 for cutting the ticket, a module 24 for turning the latter over. This module 24 as well as the module for cutting the ticket are described in detail hereafter.

The frame 2 moreover contains a printer (not shown) for printing a second ticket different from the ticket read by the reading means, this printer being controlled as a function of the data read by a reader and information received from the external control station 9.

In the example represented, the frame 2 comprises a second flap mounted in pivoting fashion inside the frame, close to the first flap, on an axis X-X' shared with the latter, this flap projecting in the closed position, from the face of the frame 2 opposite to that from which the first flap projects when it is in the closed position.

In the example illustrated by FIG. 1, the gate comprises a second frame 2*c* parallel to the first and delimiting the passage. This second frame 2*c* comprises a second flap 3*b* cooperating with the first flap 3, the opening of the first and second flaps being controlled by the reading of a valid ticket and the means associated with the opening of the passage.

Moreover, the gate can comprise a sound or visual signal associated with each normal or abnormal passage situation.

Moreover, the gate according to the invention can have a symmetrical architecture suitable for allowing passage either in one direction, or in the opposite direction.

The gate which has just been described is fully automatic.

The passenger introduces his ticket at the input 4 of the frame 2. The reading heads 16 to 19 detect the position of the ticket and read the magnetic strip. This ticket is validated by the microcomputer 8 in conjunction with the external central station 9. In case of an anomaly, the flap 3 does not open. The lateral cells of the frame detect whether the passenger is in a normal situation. If so, the flap 3 can open. Whilst the flap 3 is closed, the passenger cannot remove the coupon of his ticket at the output.

After the opening of the flap, the cells detect the exit of the passenger and the module 20 cuts the ticket in order to detach the coupon 21 and eject it to the outside. The passenger can then recover the coupon.

FIGS. 10 to 16 represent a device 30 for conveying flat documents, such as tickets, cards and the like on conveyor modules aligned with one another. This device is contained in the upper part of the frame 2.

Figure 11:
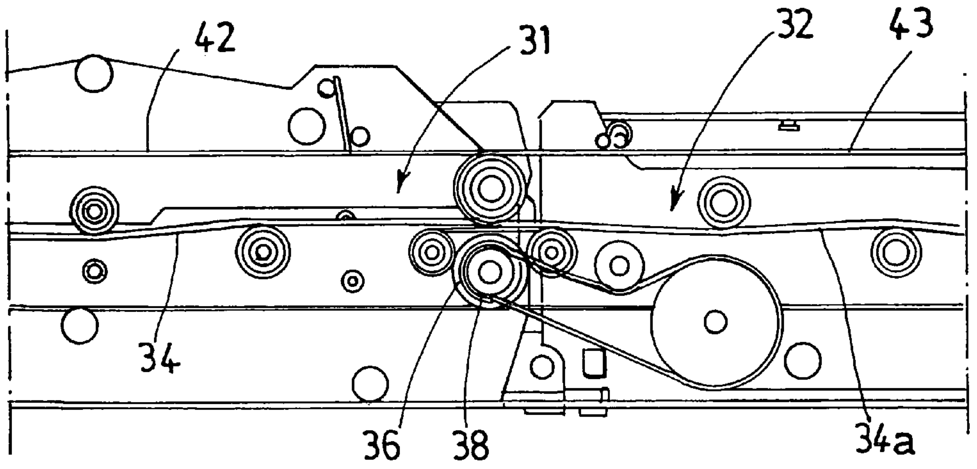
FIG. 11 is a partial longitudinal cross-section view of the conveyance route showing the junction between two conveyor modules.
Figure 12:
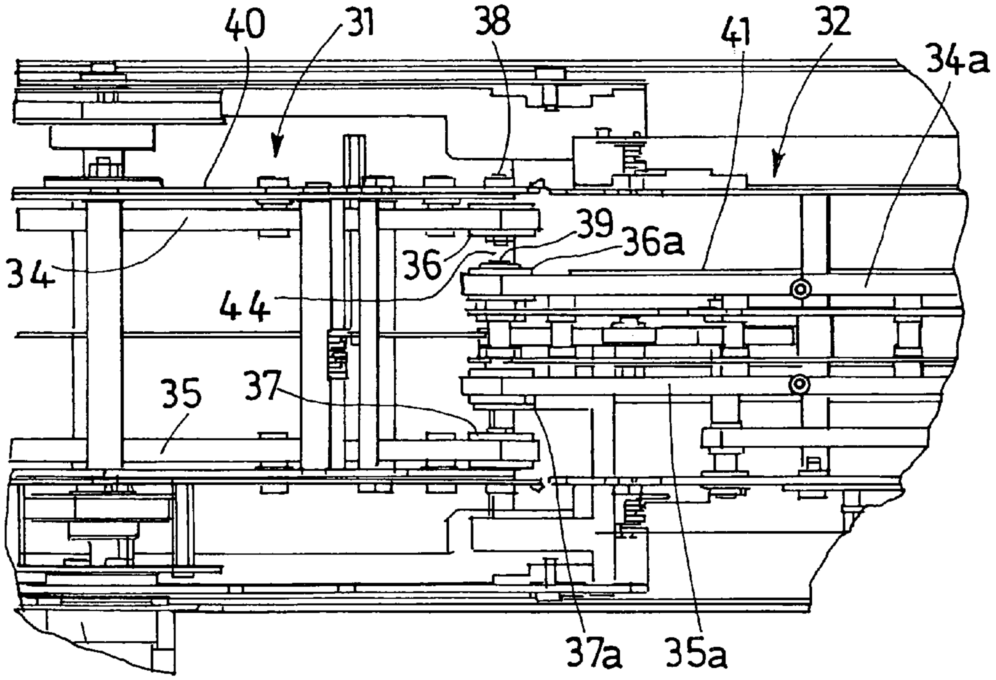
FIG. 12 is a partial plan view showing the top of the conveyance route and the junction between two modules.
Figure 13:
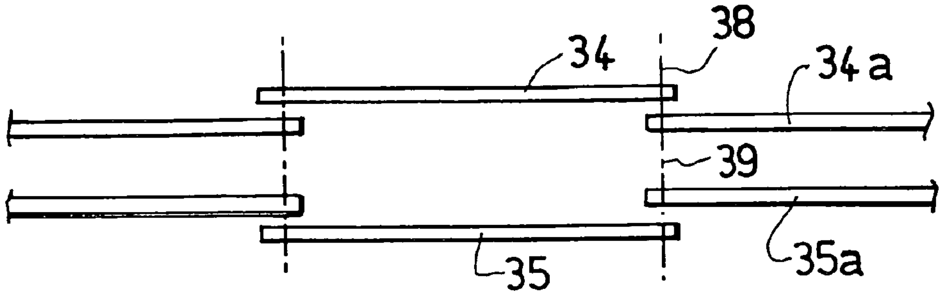
FIGS. 13, 14 and 15 are diagrammatic plan views showing three embodiments of the junction between two conveyor modules.

In the example of FIGS. 11, 12 and 13, each conveyor module 31, 32 comprises two parallel belts 34, 35; 34*a*, 35*a* each wound at their opposite ends onto two pulleys 36, 37; 36*a*, 37*a* mounted in rotation on shafts 38, 39 fixed relative to a frame 40, 41. Each of the two parallel belts (see FIG. 11) is arranged in contact longitudinally with another belt such as

42, 43 such that the documents are held between two superposed pairs of belts and carried along by the displacement of the latter.

FIGS. 12 and 13 show that the ends of the belts 34, 35 of one of the modules are situated beyond the ends of the belts 34*a*, 35*a* of the neighbouring module. Thus, the belts 34*a*, 35*a* of the module 32 are overlapping with those of the module 31, such that there is no discontinuity at the junction of the two modules.

FIG. 12 also shows that the axis 38 of rotation of the two pulleys 36, 37 of one of the modules is approximately aligned with the axis 39 of rotation of the two pulleys 36*a*, 37*a* of the neighbouring module.

Moreover, these two aligned axes of rotation, are physically different, so as to define a free space 44 between the two pulleys of one of the modules and the two pulleys of the other module, which allows the replacement of the belts.

FIG. 11 also shows that for each module, the pulleys of the two superposed pairs of belts are at each end of the latter, situated at the same level as one another.

As a variant (see FIG. 16), for each module, the pulleys 38*a*, 38 of the two superposed pairs of belts 35, 42; 35*a*, 43 could, at each end of the latter, be shifted axially from one another.

Figure 14:
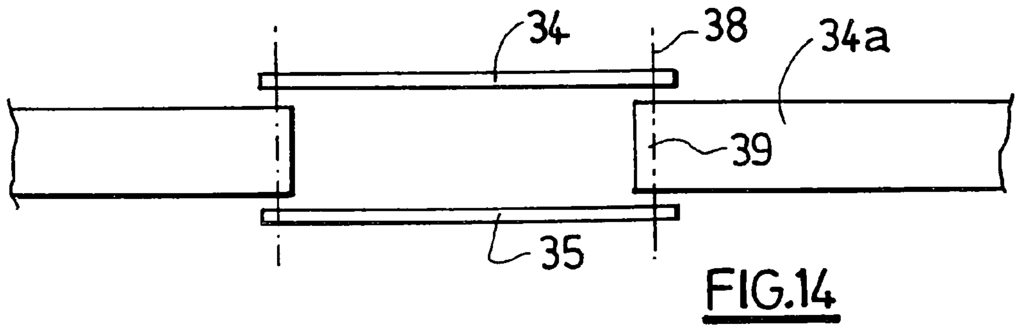

In the variant represented in FIG. 14, the module with two pairs of parallel belts 34, 35 is bordered on each side by a module comprising only a relatively broad single belt 34*a*, placed under another identical belt.

Figure 15:
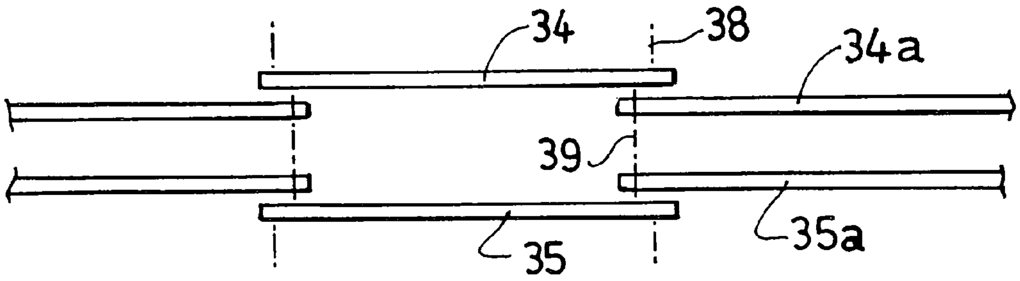
Figure 16:
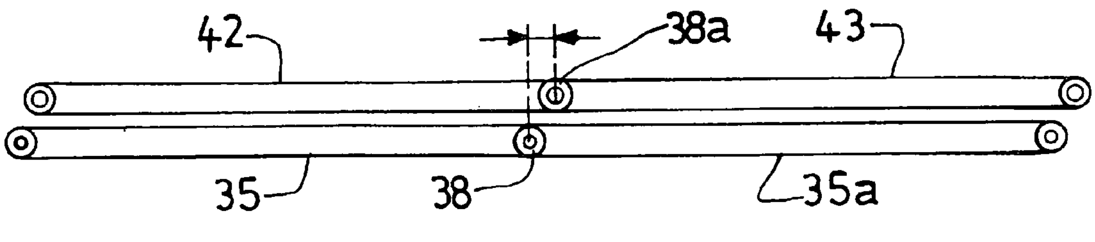
FIG. 16 is a diagrammatic side view of two modules according to another embodiment.

In the variant illustrated by FIG. 15 the shafts 38 and 39 of the pulleys of two adjacent modules are not aligned, but shifted, such that the ends of the belts 34, 35; 34*a*, 35*a* are further overlapping with one another.

The absence of discontinuity of the conveyance route 6 of the documents makes it possible to avoid any risk of the latter jamming.

Figure 10:
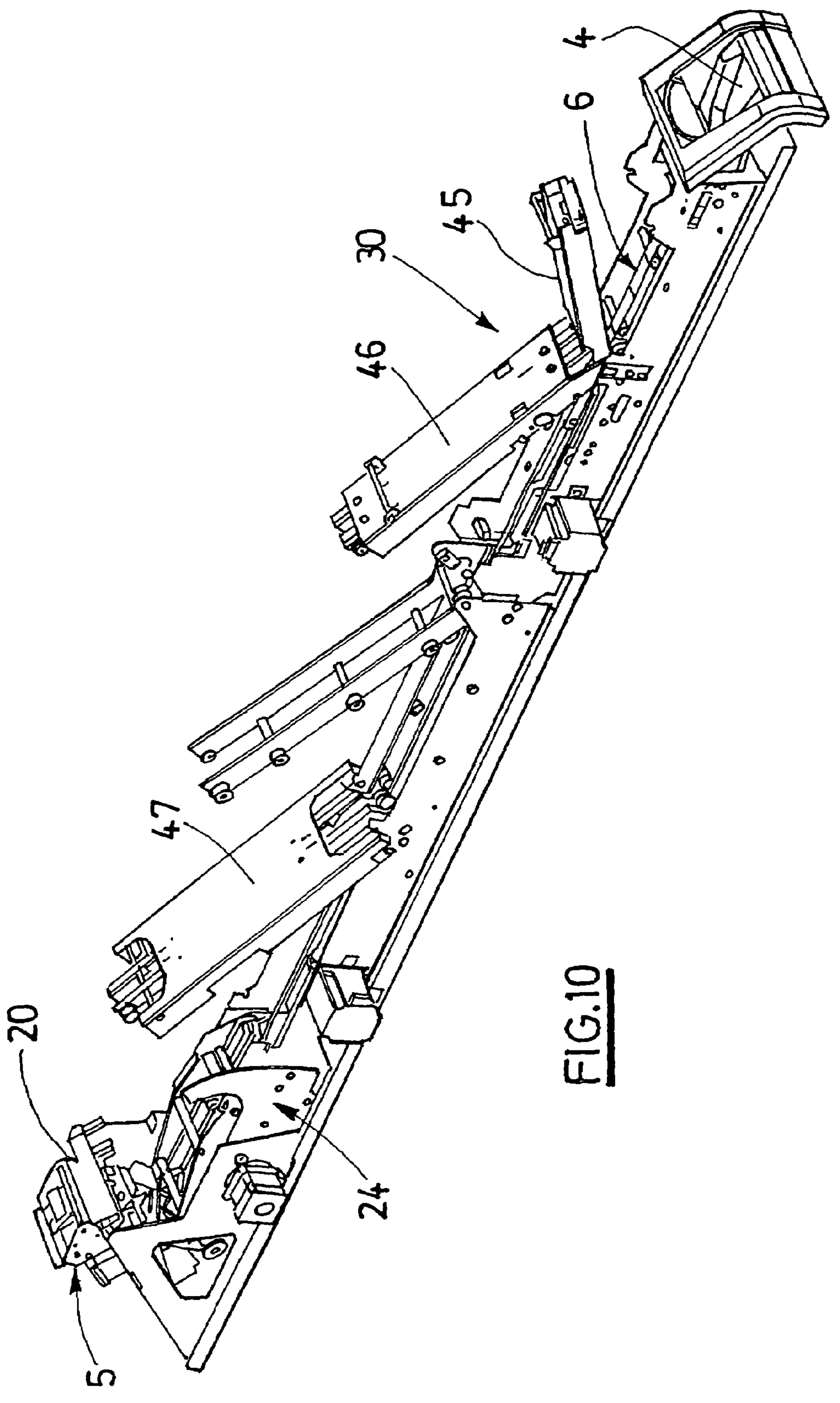
FIG. 10 is a perspective view showing the conveyance route of the automatic gate, the top covers being open.

FIG. 10 shows on the other hand, that each conveyor module is covered by a cover 45, 46, 47 which can open and close independently of the covers of the other modules. These covers facilitate maintenance of the conveyance route of the tickets.

Moreover, the upper belts and pulleys can be mounted on a frame which can be removed by pivoting relative to the lower belts and pulleys.

According to an important characteristic of the invention, the modules are independent of one another and are interchangeable.

Thus the conveyor device according to the invention can comprise several conveyor modules, certain of these modules comprising an additional function chosen from the following: reading the document conveyed, turning the document over, cutting the document, printing the document.

FIGS. 17 to 22 represent in detail the turning over module 24 mentioned above, which precedes the device 20 for separating the ticket into two parts, one of these parts being delivered to the output 5 of the separating device. This turning over module 24 is suitable for the delivered part of the ticket or coupon to be always the same whatever the direction in which the ticket is introduced into the input slot 4 of the automatic gate.

The turning over module 24 comprises upstream of the separating device 20, a unit comprising means for holding the ticket and for performing the following operations:

- directing the ticket towards the separating device 20, if the part to be detached and delivered is situated at the front,
- turning the document by 180°, if the part to be detached is situated at the rear, then directing the ticket towards the separating device 20.

The turning over module 24 moreover comprises means for directing the remaining part of the document towards a collecting container 50 or 51 (see FIG. 2).

Figure 17:
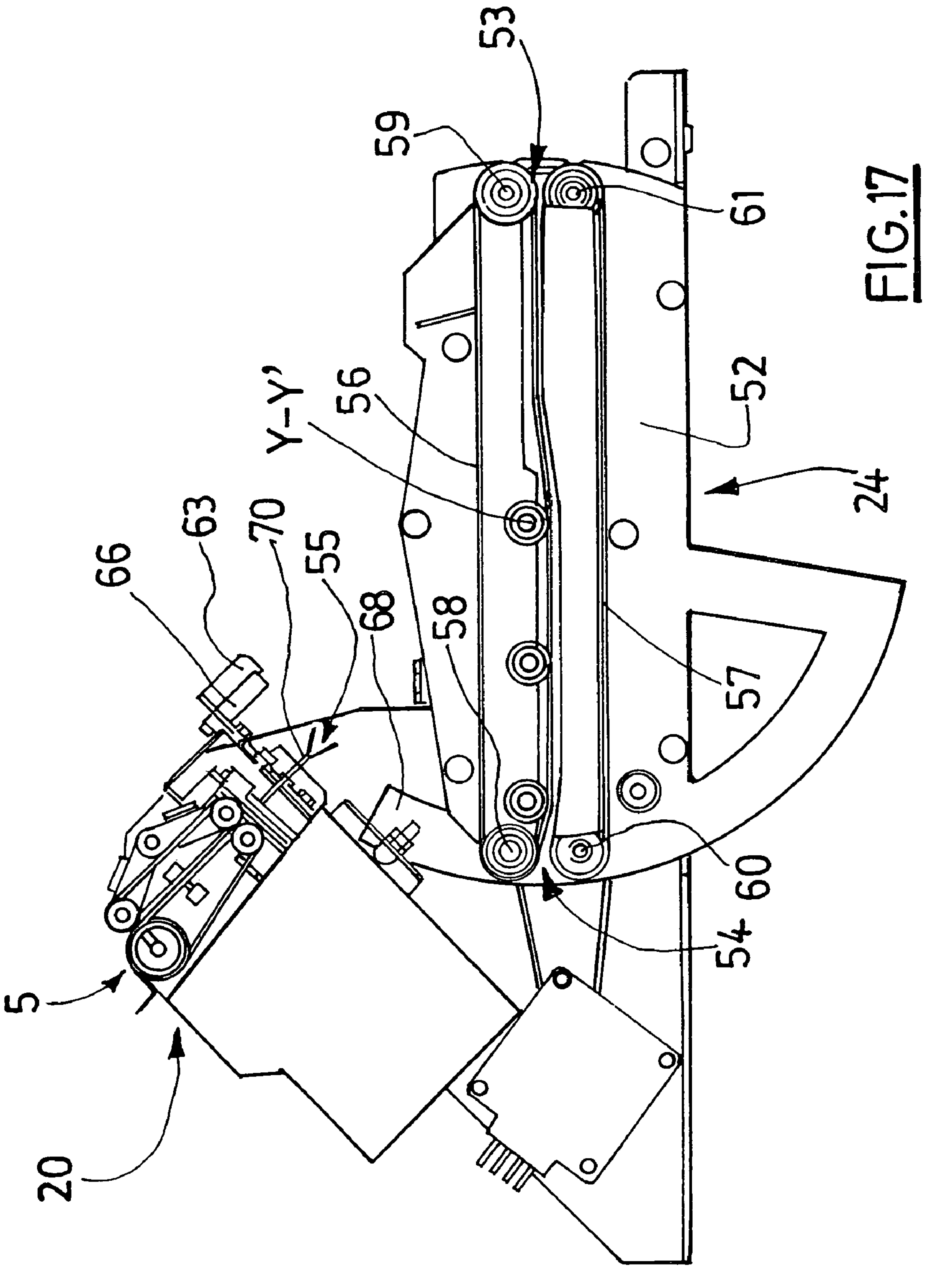
FIG. 17 is an elevation and partial longitudinal cross-section view of a tilting device and a separating device, the tilting device being in the inactive position.

As shown for example in FIG. 17, the module 24 comprises a tilting device 52 mounted in rotation about an axis Y-Y' perpendicular to the path of the ticket, comprising means for holding the ticket, this tilting device 52 comprising an input end 53 for the ticket and an output end 54 for the latter. This tilting device 52 is mobile in rotation between a position in which (see FIG. 17) the input end 53 of this tilting device is opposite a ticket conveyor module, a position in which (see FIG. 18) the output end 54 of the tilting device 52 is opposite the input 55 of the separating device 20 and a position situated at 180° to the preceding position, in which (see FIG. 20) the input end 53 of the tilting device 24 is opposite the input 55 of the separating device 20.

The tilting device 52 moreover comprises means for displacing the ticket between the input 53 and output 54 ends of the tilting device.

Figure 18:
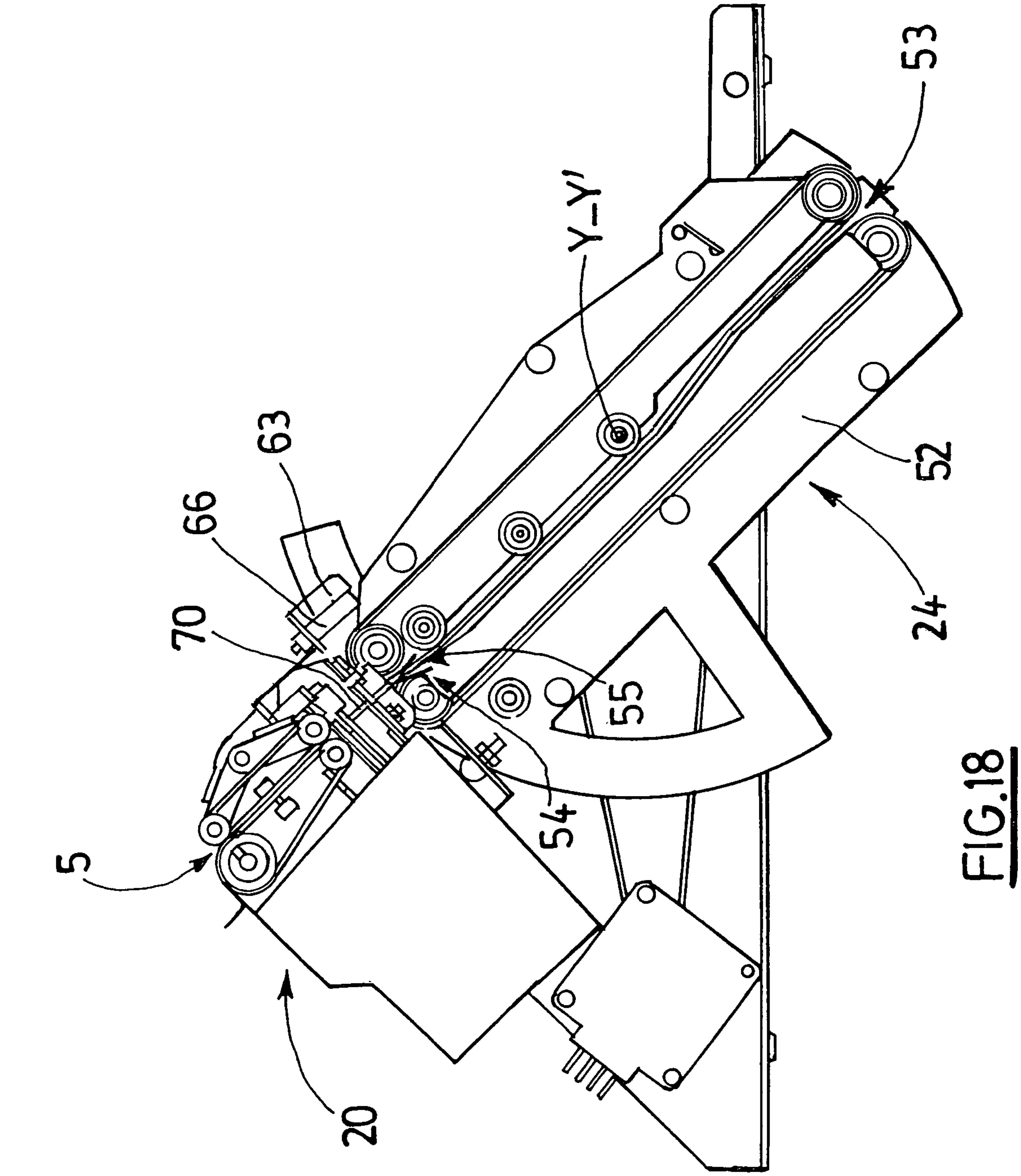
FIG. 18 is a view analogous to FIG. 17, the tilting device being in one of its active positions relative to the separating device.
Figure 19:
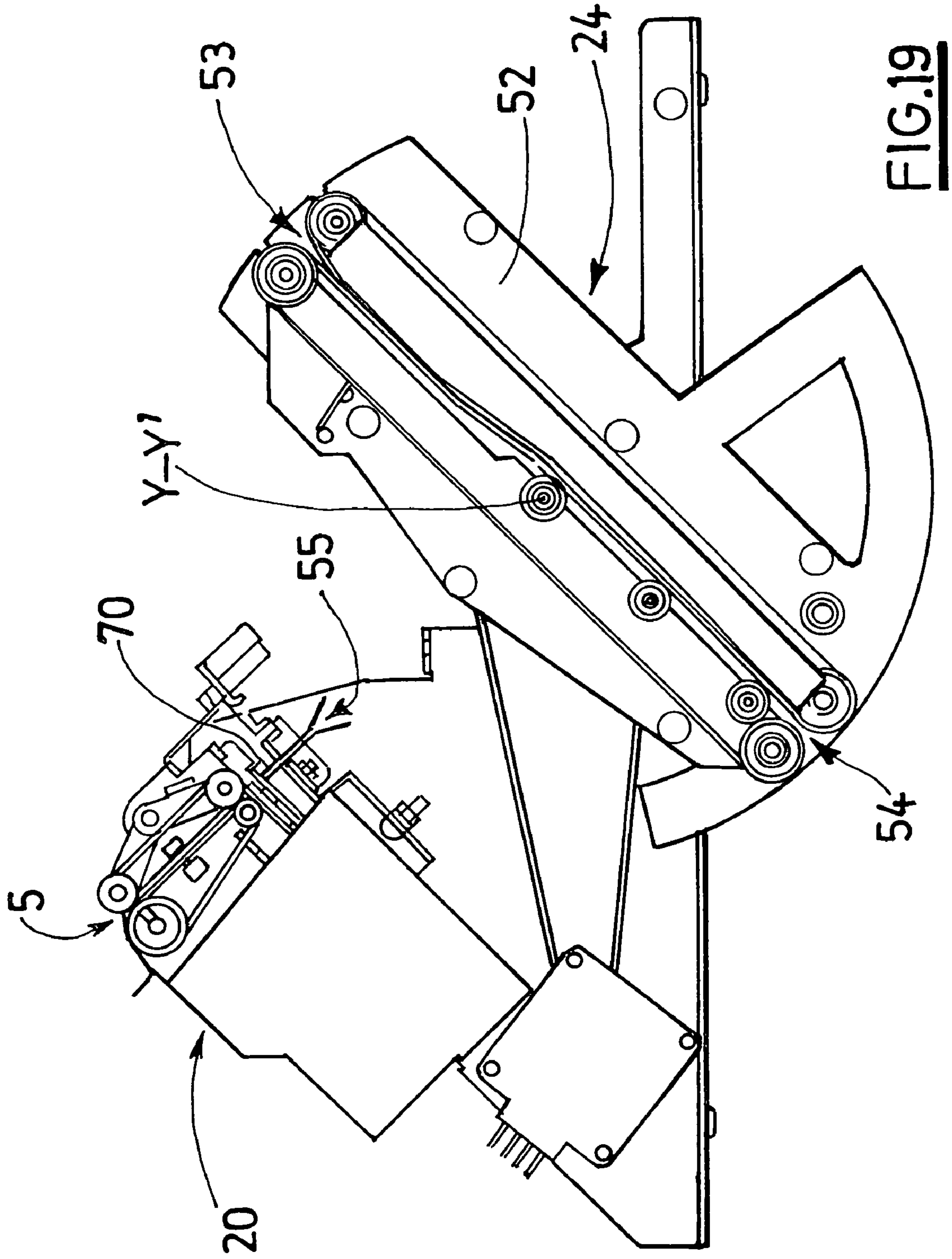
FIG. 19 is a view analogous to FIGS. 17 and 18, the tilting device being in the position of evacuation towards a storage container.
Figure 20:
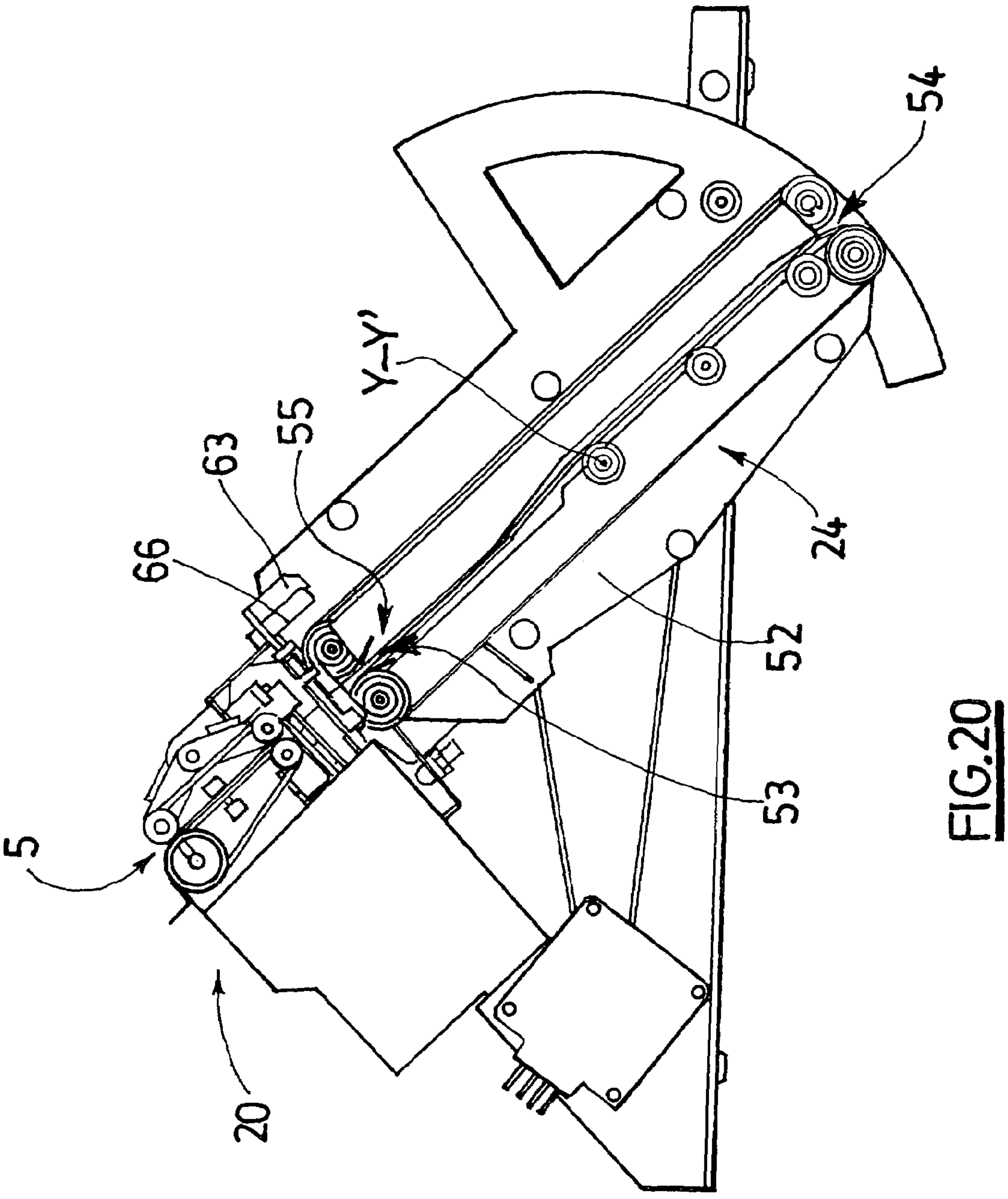
FIG. 20 is a view analogous to FIGS. 17 to 19, the tilting device being in another active position situated at 180° to the position represented in FIG. 18.
Figure 21:
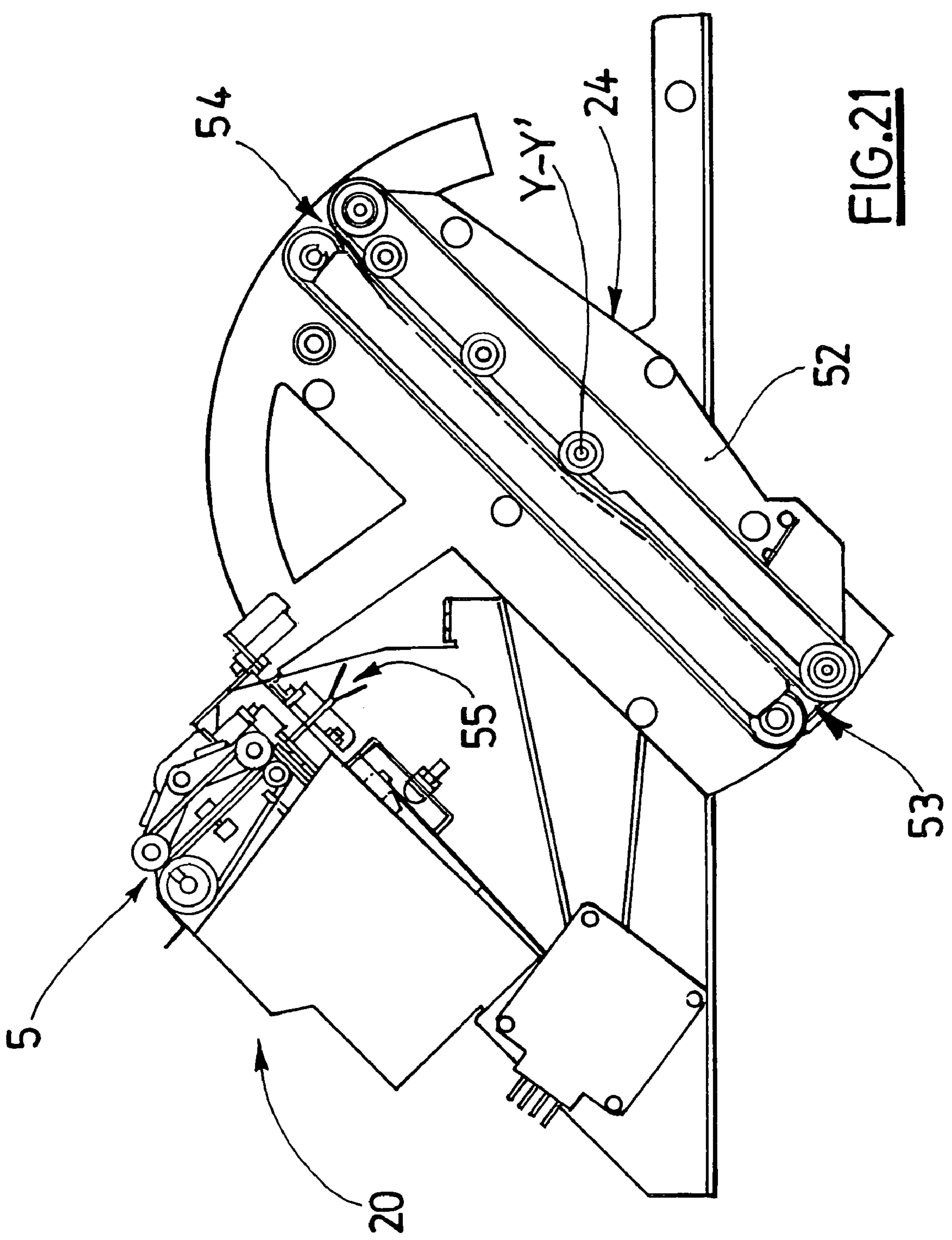
FIG. 21 is a view analogous to FIG. 19, showing another position of evacuation towards a storage container.

FIGS. 19 and 21 show on the other hand that the tilting device 52 is moreover mobile in rotation between any one of the positions represented in FIGS. 18 and 20 and two intermediate positions between the latter, in which the input 53 or output 54 end of the tilting device is opposite the input 55 of the separating device 20 but opposite a collecting container 50, 51 for the remaining part of the ticket.

The tilting device 52 also comprises means for displacing the remaining part of the ticket towards the collecting container 50, 51, when it is situated in the above intermediate positions.

In the example in FIGS. 17 to 22, the means for holding and displacing the ticket comprise two pairs of belts 56, 57 wound onto pulleys 58, 59, 60, 61, the belts being supported on both sides of the ticket in order to hold the latter and displace it by rotation of the pulleys 58, 59, 60, 61 in one direction or in another direction. The rotation of the tilting device 52 between the different positions is controlled by a stepper-type electric motor.

The rotation of the pulleys 58 to 61 is controlled by an electric motor also of the stepper type.

Figure 22:
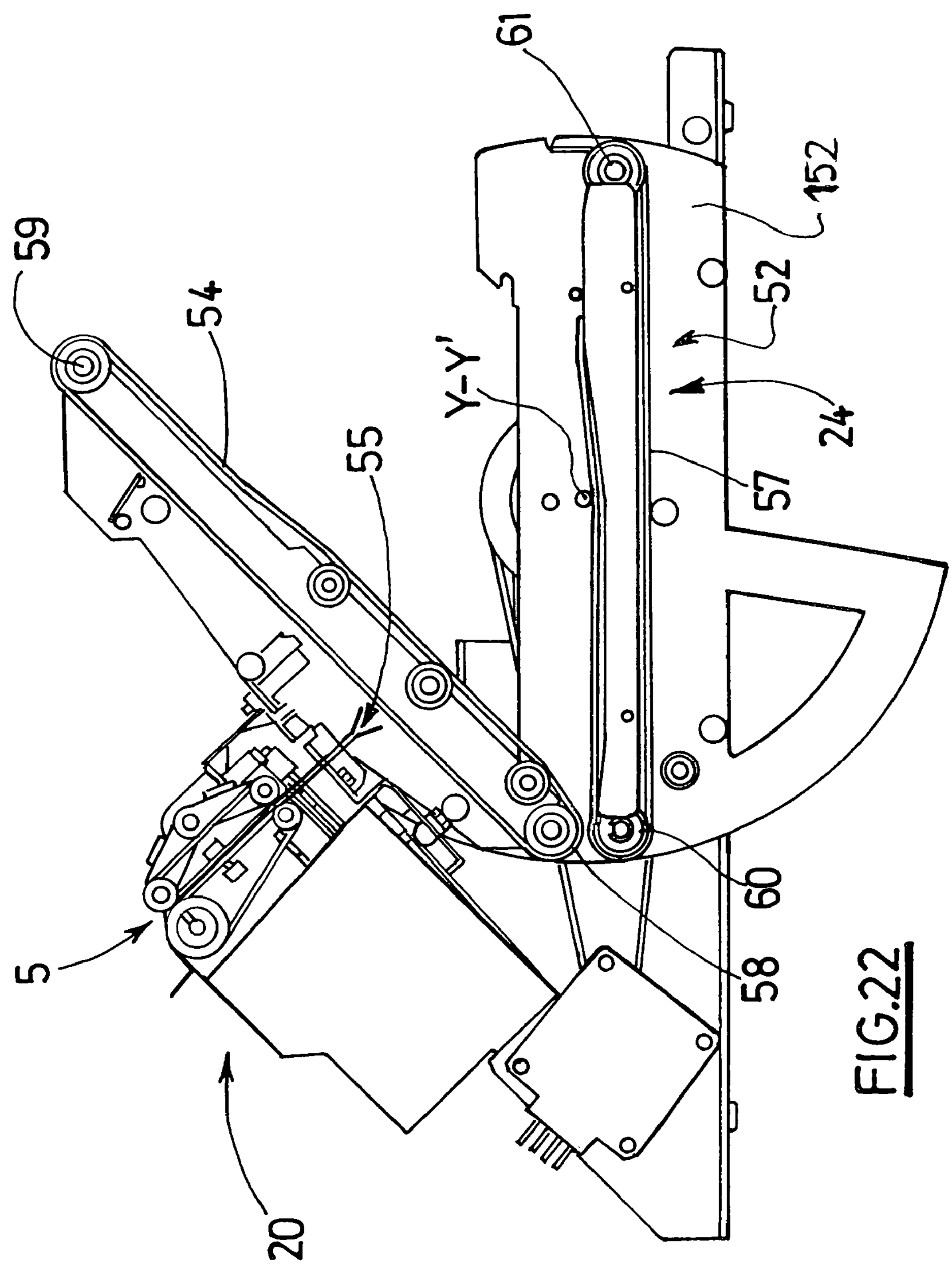
FIG. 22 is a view analogous to FIG. 17, showing the tilting device in a position in which one of the belt assemblies is separated from the other belt assembly.

FIG. 22 shows that the assembly constituted by one of the pairs of belts 56 and the corresponding pulleys 58, 59 can be separated from the assembly constituted by the other pair of belts 57 and the corresponding pulleys 60, 61 by rotation of one of the assemblies relative to the other in order to ensure holding, and if appropriate intervention in the case of a ticket jamming.

As indicated above, the module for conveying the ticket towards the tilting device 52 is associated with ticket reading heads suitable for detecting the position of the two parts of the ticket relative to its displacement direction.

These reading heads cooperate with the microcomputer 8 (see FIG. 9) in order to control the rotation of the tilting device 52 between the various positions and the displacement of the ticket in this tilting device.

Moreover, the various positions of the tilting device 52 are detected by sensors which are described in detail hereafter.

In the example of FIGS. 17 to 22, the separating device 20 is a device for cutting the ticket into two parts. The input 55 of the separating device 20, comprises a guide 70 for guiding the insertion of the ticket into the device. This guide 70 extends approximately in the direction of the ticket held between the two pairs of belts 56, 57 of the tilting device 52, when the latter is in one of the positions mentioned above opposite the input 55 of the separating device 20.

Thus as explained above, the tilting device 52 makes it possible to present at the input 55 of the separating device 20, a ticket oriented in the correct direction i.e. with the detachable coupon situated at the front, intended for the passenger having cleared the automatic gate according to the invention.

All of the above operations are fully automatic and controlled by the microcomputer 8.

Figure 23:
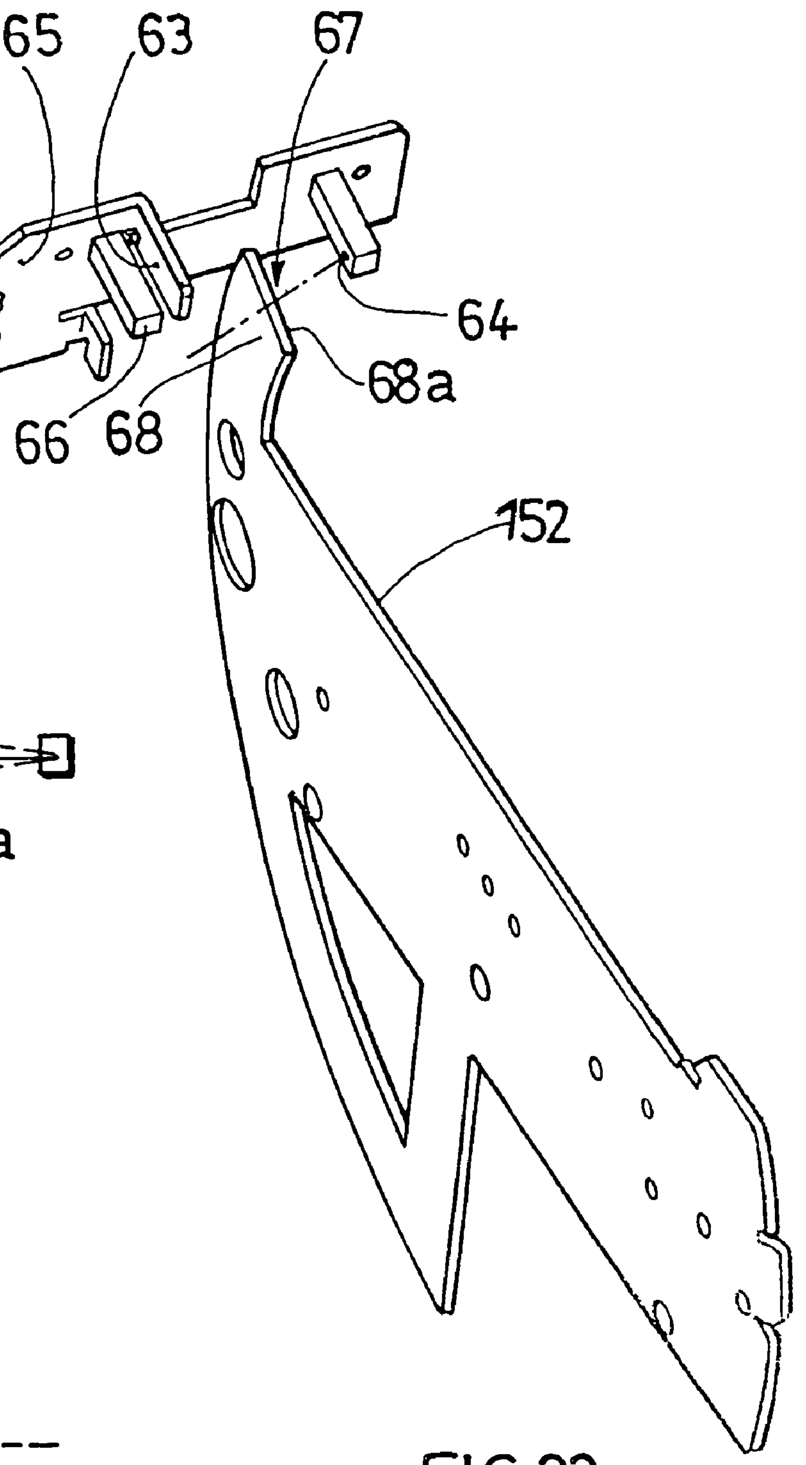
FIG. 23 is a perspective view showing a device for controlling the position of a part which is mobile relative to a reference piece.
Figure 24:
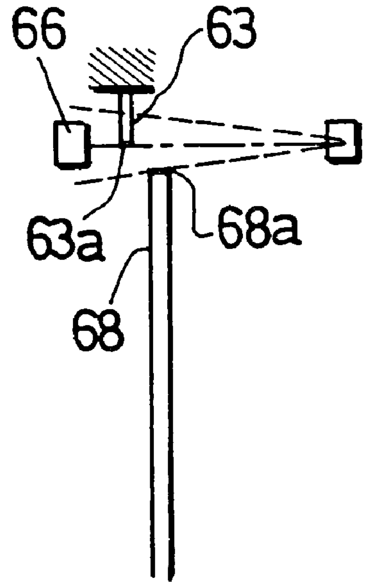
FIG. 24 is a plan view of FIG. 23.

FIGS. 23 and 24 represent a device for controlling the position of part of the tilting device 52 relative to a fixed reference 63. This device comprises a cell 64 emitting a conical light beam 67 fixed to a part 65 fixed relative to the frame 2.

The conical light beam 67 is directed towards the fixed reference part 63 and towards a receiver 66 arranged opposite the face of the fixed reference part 63 opposite the cell 64, and which can capture the part of the conical light beam 67 which is not masked by the reference part 63. The mobile mechanical part 152 comprises a part 68 which can intersect the conical light beam 67 when it is in the position to be controlled opposite the receiver 66 at the end of the overlap with the fixed reference part 63.

In the example represented in FIG. 23, the reference part 63 is a tab projecting perpendicularly from a fixed flat plate 65. This tab 63 is parallel to the part 68 of the mobile part 152. The part 68 comprises an upper edge 68*a* capable of being aligned with the lower edge 63*a* of the tab 63 when the mobile part 152 is in the position to be controlled. The receiver 66 is placed slightly below the lower edge 63*a* of the tab, such that when the upper edge 68*a* of the part 68 of the mobile part 152 is aligned with the lower edge 63*a* of the tab 63, the receiver 66 detects a total intersecting of the light beam 67 emitted by the cell 64.

In the example represented, the mobile part 152 is a part mobile in rotation towards at least one limit position to be controlled, namely that represented in FIGS. 23 and 24. This mobile part forms part of the tilting device described above which is mobile in rotation between several positions in order to send a ticket directly or by turning it over after a 180° rotation of this tilting device towards the device 20 for separating the ticket into two parts.

The device represented in FIGS. 23 and 24 operates in the following fashion:

The limit position to be controlled is that in which the edge 68*a* of the mobile part 152 after having turned through a certain angle arrives in alignment with the edge 63*a* of the fixed reference 63. Slightly before this limit position, the light beam 67 emitted by the cell 64 is stopped down by the upper edge 68*a* of the part 68 of the part 52 and by the lower edge 63*a* of the reference part 63. Therefore, the receiver 66 only picks up the part of the light beam 67 which passes through the abovementioned aperture.

When the upper edge 68*a* of the part 52 arrives exactly in alignment with the edge 63*a* of the fixed reference 63, the beam 67 is totally masked by the part 68 and by the reference 63, such that the receiver 66 picks up no more light. The electric signal corresponding to this situation can then control the stopping of the motor which drives in rotation the mobile part 52, namely the tilting device in the example considered.

In the case of the tilting device 52 represented in FIGS. 17 to 22, the limit position in which the output 54 or its input 53 must be aligned with the input 55 of the separating device 20 is detected by the receiver 66 of a light beam which cooperates with the fixed reference part 63 and with the part 68 of the tilting device 52 or with a part of the latter shifted 180° relative to the part 68.

In the example of FIGS. 17 to 22, the receiver 66 and the reference part 63 are fixed to the upper part of the separating device 20.

In the example represented, the upper edge 68*a* of the part 68 and the lower edge 63*a* of the tab 63 are rectilinear.

Figure 24A:
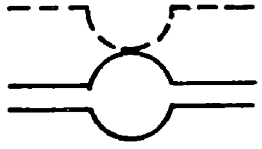
FIG. 24A is a diagram showing a variant of the shape of the edges of the mobile and reference pieces.

In a variant represented in FIG. 24A, the upper 68*a* and lower 63*a* edges of the above pieces are concave and rounded in shape, such that when the limit position to be controlled is reached, the two shapes intersect at a point.

This variant would also make it possible to further improve the position controlling precision.

The above device can be used for measuring distances, angles and speeds of rotation.

Figure 26:
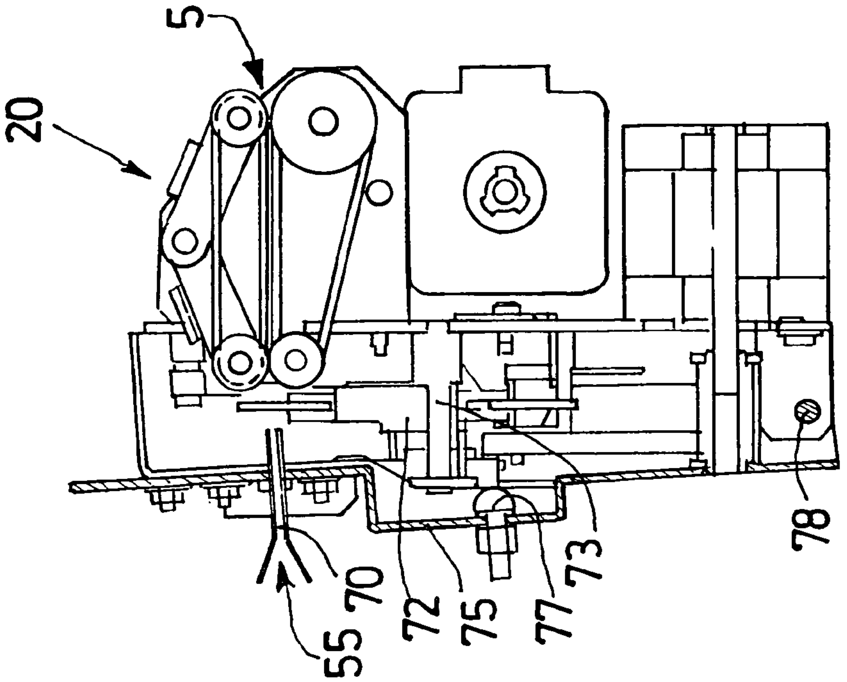
FIG. 26 is a view analogous to FIG. 25, on a smaller scale, showing the guide and the cutting blade in a second position.
Figure 25:
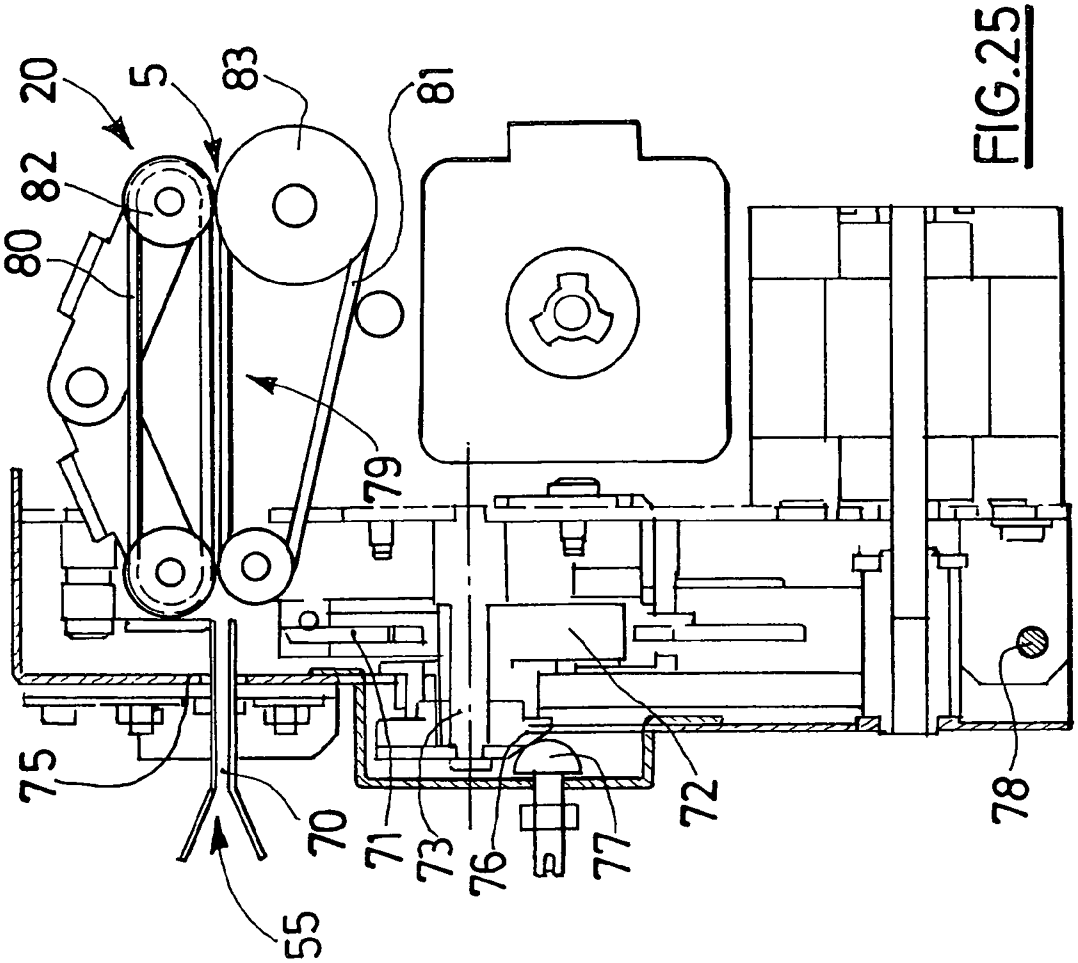
FIG. 25 is an elevation and longitudinal cross-section view of a separating device showing a first position of the guide and the cutting blade.

FIGS. 25 and 26 represent the separating device 20 which is arranged following the turning over module 24. The separating device 20 comprises a guide 70 the input 55 of which is arranged opposite the output 54 of the tilting device in order to guide the displacement of the ticket towards the output 5.

The separating device 20 comprises on the other hand a knife blade 71 which is mobile in translation between a position (see FIG. 25) at a distance from the path of the ticket defined by the guide 70 and a position (see FIG. 26) in which the knife blade 71 cuts the above path, i.e. separates the ticket into two parts.

Moreover, the guide 70 is mobile between a position (see FIG. 25) at a distance from the output of the tilting device 24, in which the cutting blade 71 is in the position at a distance and a position (see FIG. 26) close to the output of the tilting device in which the blade 71 is in the position in which it cuts the path of the ticket in order to separate it into two parts.

This arrangement improves the guiding of the ticket in the separating device in order to avoid any risk of jamming.

The separating device 20 comprises means for controlling the displacement of the cutting blade 71 and means for controlling the displacement of the guide 70 between the two abovementioned positions. These means are suitable for controlling the displacement of the cutting blade 71 when the ticket is in part clear of the output 70 whilst also being in part engaged in the guide and in part engaged in the conveyor 79 described hereafter.

In the example represented the means for controlling the displacement of the cutting blade 71 comprise (see FIG. 27) a cam 72 integral with a shaft 73 driven in rotation by an electric motor. This cam 72 cooperates with the edges of a window 74 cut in the cutting blade 71.

In the example represented, the guide 70 is constituted by two plates spaced at a distance suitable for the passage of the ticket.

The means for controlling the displacement of the guide 70 comprise a support 75 of this guide integral with the latter and extending transversally to this guide 70. The displacement of this support 75 is controlled by a second cam 76 (see FIG. 27) integral with the shaft 73 driven in rotation by the electric motor mentioned above. This cam 76 cooperates with a bearing surface 77 of the support, as shown in FIG. 25.

Thus the cam 72 cooperating with the cutting blade 71 and the cam 76 cooperating with the support 75 of the guide 70 are integral with the same shaft 73 driven in rotation by the electric motor.

The displacement of the support 75 is guided in rotation about the axis 78, as indicated in FIG. 25. This displacement of the guide support could also be guided in translation.

As FIGS. 25 and 26 show, the separating device 20 comprises in alignment with the guide 70, a conveyor 79 with superposed belts 80, 81 capable of conveying the cut-off part of the ticket towards the output 5 of the device.

The belts 80, 81 of the conveyor 79 are wound onto pulleys 82, 83 driven in rotation by an electric motor.

The separating device 20 which has just been described operates as follows.

The ticket is directed in the guide 70 by the belts of the tilting device 24.

In a first phase, the guide 70 is pushed by its support 75 and by the cam 76 up to the position shown in FIG. 20, where the end of the guide 70 is close to the conveyor 79. During this displacement of the guide 70, the cutting blade 71 is at a distance from the guide.

In a second phase, the guide 70 goes back to the position shown in FIG. 21 leaving the ticket in the path of the cutting blade 71. The latter is then displaced under the effect of the cam 72 and cuts the ticket into two parts.

The front part of the ticket, i.e. the coupon, is conveyed towards the output 5 where it can be recovered by the passenger.

The rear part of the ticket is removed by the tilting device 24 and is stored in one of the containers 50, 51.

In the variant illustrated by FIGS. 28 and 29, the pivoting of the support 75 of the guide 70 is controlled by a ramp 90 which is integral with the cutting blade 71. The translation movement of the blade 71 carries along in its movement the ramp 90 which by resting on the bearing surface 77 causes the pivoting of the support 75. A return spring (not shown) controls the reverse movement.

The embodiments of FIGS. 30 and 31 will now be described.

Figure 30:
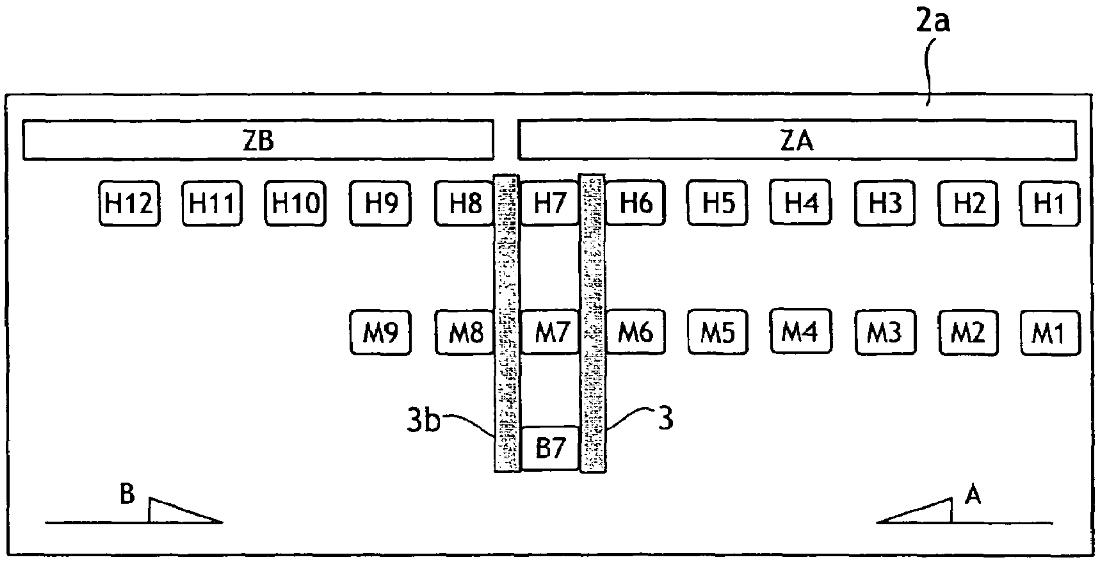
FIGS. 30 and 31 are each a diagrammatic view, similar to FIG. 6, of a lateral face of the automatic gate showing the location of the detector cells, in embodiments comprising 3 rows of cells, the embodiment of FIG. 31 comprising additional cells relative to the embodiment of FIG. 30; and, FIGS. 32 and 33 illustrate the grouping of the cells in different control zones.
Figure 31:
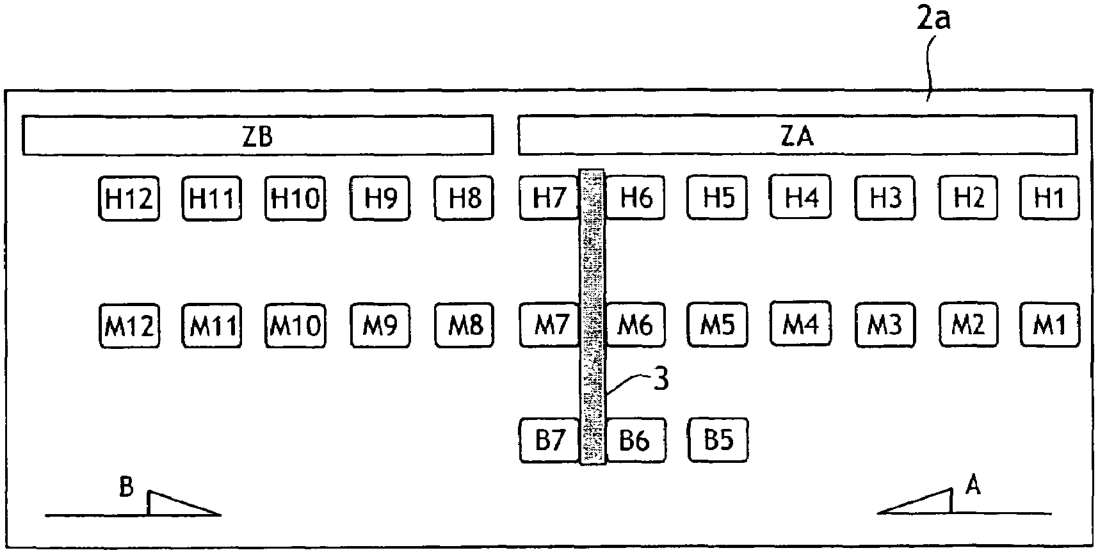
Figure 32:
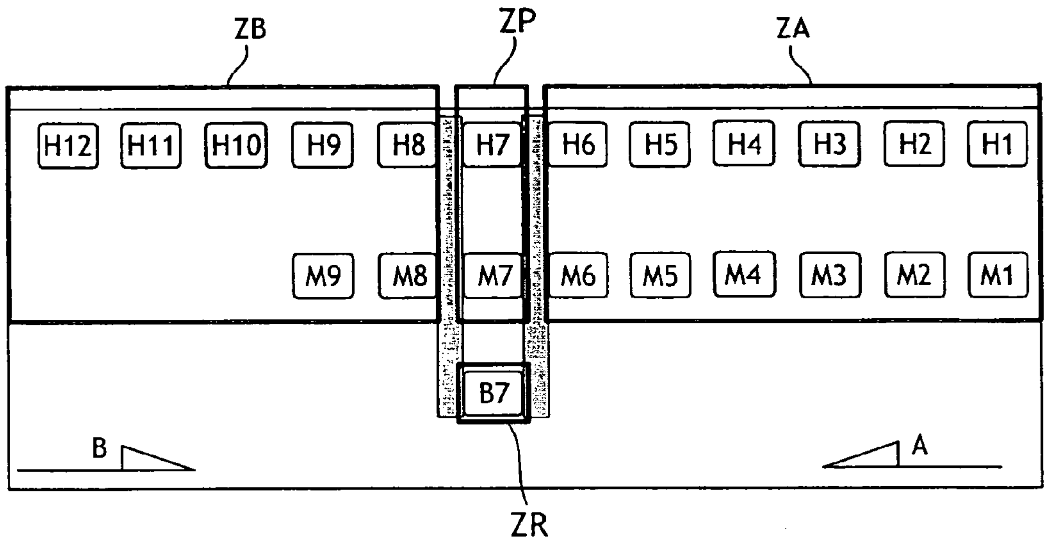
Figure 33:
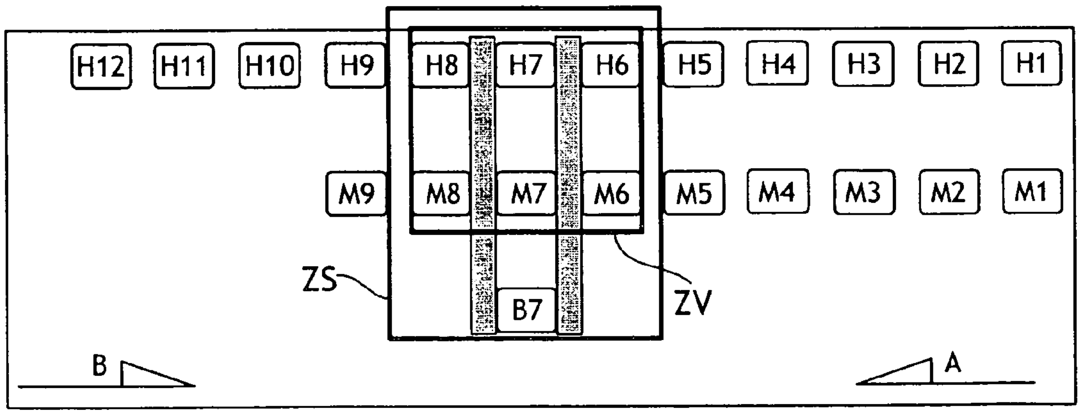

The lateral face of the frame, as illustrated in FIGS. 30 and 31, comprises three superposed rows of cells superposed in relation to each other. As in the embodiment of FIG. 6, a first middle row of cells M is situated close to the mid-height of the lateral face 2*a* of the frame 2, and a high row H situated above the middle line M. It comprises moreover a low row B situated below the middle row. The cells are arranged in columns numbered 1 to 12, in the direction of access to the space, represented by an arrow A. The opposite direction of displacement is represented by an arrow B. The cells are designated by the letter of their row associated with the number of their column. Thus, the cell M5 is the cell in the middle line in the fifth column. Each row defines a horizontal detection plane, middle, high and low respectively.

The embodiment of FIG. 30 will now be described, and particularly its operating mode. As described previously, in particular with reference to FIGS. 1, 2 and 6, in the embodiment of FIG. 30, the gate comprises two flaps which are mobile in planes perpendicular to the face 2*a* of the frame 2, to both sides of the seventh column. The flaps are represented in FIG. 60 by their projections 3, 3*b* on the face 2*a*, the first flap 3 being situated between the sixth and seventh columns, and the second flap 3*b* being situated between the seventh and eighth columns. An entry zone ZA is defined extending from the first to the seventh column, i.e. up to the second flap, then an exit zone ZB, extending beyond the second flap.

The high plane is used for the detection of adults, the middle plane for that of children and the bottom plane for the detection of persons who are crawling in the apparatus. The combination of high and middle planes makes it possible to differentiate between a person, a child or a trolley and a part of hand luggage. For example, if only the top cells are covered, the apparatus is detecting a part of hand luggage; if only the bottom cells are covered, the apparatus is detecting a child or a trolley; if the top and bottom cells are covered, the apparatus is detecting a person. The term trolley can in particular include a wheeled suitcase.

An object of the gate is to ensure secure access, in particular while passengers are boarding an aeroplane, this is this case which is taken as an example hereafter. Any non-authorized access must therefore be detected. The cells serve to detect non-authorized access via abnormal movements. A distinction can optionally be drawn between an intrusion and a fraud. Any abnormal movement in the gate can be considered as an intrusion, to the extent that there is no fraudulent clearing of the obstacle. A distinction is drawn in particular between intrusion in the unenergized state, intrusion in the opposite direction, i.e. in the direction of the arrow B, and the small group before or after an authorized passage, i.e. when two persons attempt to clear the gate one behind the other, taking advantage of authorization for only one of said persons. An illicit clearing of the obstacle can be considered as a fraud. Similarly, a distinction is drawn between unenergized, opposite-direction and small-group fraud.

By broad-zone fraud is meant a fraud during which a person obstructs a certain number of cells (which can be parameterizable) and the clearing of the flaps is detected.

In order for a "crawling" fraud to be detected, the person has to obstruct only the low cell B7.

A small group is detected when a number of consecutive cells, in the same row or superposed in two rows, covered simultaneously, is greater than a given number.

Preferably, it can be provided that in all these hypothetical cases, once an intrusion is detected, and a fortiori a fraud, the flaps receive a command to close, and close immediately if they were open or are kept closed if they were not. Of course, it can also be provided that the flaps close only if there is nobody in the flap-closing zone, in order to avoid injuring a person who would be present in the flaps zone. The closing of the flaps can be replaced or completed by a sound and/or light signal, for example pictograms. It can moreover be provided that a message be sent to a host system, for example a central computer. The state of intrusion or fraud can be maintained for a certain parameterizable time, after the cause giving rise to said state has disappeared.

An evacuation operation mode can be provided, for example when an evacuation command is activated locally, in which the gate is held open in order to allow free circulation, in particular in the opposite direction B.

The clearing of the gate is generally authorized after the reading of a valid access ticket by a reader for the access ticket. The reader and the gate share a common frame. They must behave coherently vis-à-vis the passenger. The latter introduces for example a coupon into the reader, moves forward so that the flaps of the gate open and recovers his cut-off document at the rear of the reader.

The reader must for its part know the state of a gate controller. It must be able to adapt its behaviour to the gate's activity.

The state "gate active" indicates that the gate controller is initialized. The reader must take these different states into account when it processes a coupon. The reader considers that the gate is unavailable for the introduction of a coupon unless it has explicitly said that it is ready (or almost ready), occupied or inactive. The state "gate active" corresponds to the initial state of the gate seen by the reader.

The state "gate inactive" indicates that the gate controller is not controlling the passenger flow. This is typically the case where the passage is permanently open. The reader in this case does not take the state of occupation of the gate into account. It considers that the gate is available all the time.

The state "gate ready" indicates that the gate is ready to accept its clearance by a passenger. This is the gate's "unenergized" state. The reader considers that the gate is then available for the introduction of a coupon.

The state "gate occupied" indicates that the gate is occupied. This is typically the case where the gate is open or is processing its clearance by a passenger. This is also considered to be the case where the gate is blocked because of maintenance or because of passage obstruction. The reader considers that the gate is then unavailable for the introduction of a coupon. Advantageously, if the gate is not ready after a given time, and an access ticket has been introduced via the ticket input, the ticket is returned to the ticket input.

The state "gate almost ready" indicates that the gate is active and that it will be ready, all being well, very shortly. This is typically the case where the gate controller is beginning to close the passage again, because the passenger has moved far enough forward. The gate will only actually become ready if the passage is completely closed. If the passage has to be re-opened by the gate controller, the gate will again become "occupied" and if a new coupon has been introduced into the reader it is rejected. This state makes it possible to anticipate the introduction of a new coupon into the reader, but this anticipation must remain local to the reader. To the extent that the gate is not ready, no message signalling that a document has been introduced can be sent towards a host system by the reader. During this state the reader considers that the gate is available for the introduction of a coupon.

Several passenger-passage statuses are possible. Each status corresponds to a stage in the clearance of the gate by the passenger.

The state "gate entry" indicates that the authorized passenger is situated in the gate's entry zone.

The state "gate crossing" indicates that the authorized passenger is in the process of clearing the flaps.

The state "gate exit" indicates that the passenger has cleared the flaps and is leaving the gate.

A delay time can be provided and engaged after at least certain of the stages of clearing the gate, an anomaly being detected if a subsequent gate-clearing stage is not carried out within this delay time. Thus, certain delay times exist for each of the states. Variables are activated as a function of the expiry or otherwise of the times assigned to, or authorized for, each of the delay times.

The gate controller activates the gate entry "wait" variable when the delay time for entry into the gate has expired. This means that the authorized person has not cleared the flaps and has remained outside the gate for a time greater than the authorized time. This variable is maintained until a new authorization is presented.

The gate controller activates the gate-passage "wait" variable when the gate-passage "wait" time has expired. This means that the authorized person has not cleared the flaps and has remained in entry zone ZA of the gate for a time greater than the authorized time. This variable is maintained until a new authorization is presented.

The gate controller activates the end-of-passage variable when the end-of-passage time has expired. This means that the authorized person has cleared the flaps and is not leaving the gate, i.e. remains in the exit zone ZB, for a time greater than the authorized time. This variable is maintained until a new authorization is presented.

The gate controller also takes into account the state of certain switches, in particular a push button activated in case of evacuation, and end-of-travel sensors for each of the flaps, when opening and closing. Thus, the gate controller activates the evacuation variable when the evacuation push button is activated, the controller activates the opening end-of-travel variable when the opening end-of-travel sensors are reached, and the closing end-of-travel variable when the closing end-of-travel sensors are reached.

Several gate operating modes are possible. The gate comprises means for initializing these modes. These modes are: controlled gate A, Closed A, Closed B, Evacuation and Maintenance.

In evacuation mode, the flaps are permanently open and all the pictograms are green. It is possible to pass freely through the passageway. No passage control is carried out. This operating mode is allowed unconditionally.

Maintenance mode allows testing of the sound signal, the pictograms, the flaps and the cells. In this operating mode, it is possible to pass freely through the passageway. The flaps are open and all the pictograms are red, except in pictogram test mode where the pictograms alternate between green and red, for example every second.

A mode in which the gate is controlled in direction A and closed in direction B is the automatic mode generally used. In this mode, the flaps are closed, the orientation pictogram is green and in the shape of an arrow indicating direction A. Passage through the gate is only authorized in direction A, following a valid passage request. All abnormal movements are managed in this operating mode.

In direction A and direction B closed mode, the flaps are closed and all the pictograms are red, in the shape of a cross, and signal that passage is prohibited whether access is in direction A or direction B. It is prohibited to pass through in either direction. A presence in the device, in zone A or zone B is considered an anomaly.

Moreover a normally open (NO) mode and a normally closed (NF) mode exist. In NO mode, the flaps are open, unenergized and close again in case of intrusion and fraud. In NF mode, the flaps are closed, unenergized and open in case of authorized passage.

The cells are grouped together such that they define detection zones. The same cell can belong to several detection zones.

Cells H1 to H6 and M1 to M6 are grouped together in entry zone ZA. Cells H8 to H12 and M8 to M9 are grouped together in exit zone ZB. A crawling zone ZR contains the cell B7. A zone in the gate ZP contains the cells H7 and M7. When there is nobody in these four zones, the passageway is declared empty, if not, it is occupied.

A presence in front of one of the cells H1, H2, H3, H4, H5, H6, M1, M2, M3, M4, M5 or M6 indicates a presence in zone A.

A presence in front of one of the cells H8, H9, H10, H11, H12, M8 or M9 indicates a presence in zone B. A presence in front of one of the cells H7 or M7 indicates a presence in the zone of the gate. A presence in front of B7 indicates a presence in the crawling zone.

A flaps zone ZV contains the cells H6, H7, H8, M6, M7 and M8. This zone makes it possible to determiner the passage of a person in direction A or B.

The detection of a presence simultaneously in front of a cell in the high row and in the middle row of the same column indicates the presence of an adult. Thus, a presence in front of H1 and M1, H2 and M2, H3 and M3, H4 and M4, H5 and M5 or H6 and M6 indicates the presence of an adult in entry zone ZA.

The detection of a presence in front of a cell in the middle row but not in the high row of the same column indicates the presence of a child. Thus, a presence in front of M 1 and not H1, M2 and not H2, M3 and not H3, M4 and not H4, M5 and not H5 or M6 and not H6 indicates the presence of a child in the entry zone ZA.

Among these detection zones, there is a safety zone ZS which avoids possible interference with the opening or the closing of a flap by a person or an obstacle, for example a luggage trolley. The safety zone ZS is constituted by the cells H6, H7, H8, M6, M7, M8 and B7. When the flaps are open, they will close only if the closing safety zone is clear. The closing control is activated after a delay time. When the flaps are closed, they will open only if the safety zone is clear. The opening control is activated after a delay time.

Hereafter, it is considered that the gate is operating in the mode for which passage is controlled in direction A and closed in direction B.

As the system works without data storage, the presence of more than one person in entry zone ZA is considered a “small group” before passage. The exception to this rule is the presence of an adult followed by a trolley. In that case, the system does not draw a distinction between an adult followed by one or more children and an adult followed by a trolley.

The presence in the exit zone ZB of more than one child associated with the presence of at least one adult is considered a small group after passage.

Groups of cells are defined. A group is made up of at least two consecutive covered cells, i.e. belonging to the same row and to two adjacent columns, surrounded by at least one which is not covered. When a person is situated in the device, he covers a certain number of consecutive cells. A maximum given number of consecutive covered cells is considered as signalling the presence of a single person. If this maximum number is exceeded, it is considered that there are two persons sticking close to each other in the gate entry zone and this is considered a wide-zone fraud. It is examined whether the number of cells per group detected exceeds the maximum number of authorized cells.

A general algorithm for detection of the passage used according to different types of scenarios is the following. A counting zone of is made up of three successive columns each comprising a group of cells. First, a first column is arrived at, then the second and finally the third of these three. The first is then left, then the second and finally the third of the three. Passage is validated when the third column is left.

Thus, the passage of an adult straight through the flaps, in direction A, is determined by:

the successive covering of cells H6 and M5 (or M6 or M7),
then of cells H7 and M6 (or M7 or M8),
and finally H8 and M7 (or M8 or M9),
and by the successive uncovering of cell H6,
then of cell H7,
and finally H8,
H7 always being uncovered.

Thus, the passage of an adult straight through the flaps, in direction B, is determined by:

the successive covering of cells H8 and M7 (or M8 or M9),
then of cells H7 and M6 (or M7 or M8),
and finally H6 and M5 (or M6 or M7),
and by the successive uncovering of cell H8,
then of cell H7, and finally H6,
H7 always being uncovered.

Thus, the passage of a child straight through the flaps, in direction A, when an adult is not passing through, is determined by:

the successive covering of cell M6, H5
whereas H6 and H7 are uncovered,
then of cell M7, H6, and H7 and H8 being uncovered,
and finally M8 and H7 and H8 and H9 being uncovered,
and by the successive uncovering of cell M6,
then of cell M7, and finally M8,
M7 being always uncovered.

It will be noted that, if the passage of an adult has already been detected, the stages described above can signal the presence of a trolley pulled by this person, or of a child accompanying him.

If passage authorizations are in process for a given direction (A or B), the number of authorizations in process is decreased by one during each passage in this direction following the reading of the access ticket. Thus, the flaps zone ZV, serves for counting the persons clearing the gate. Once a passage has been counted, for a single authorization, the flaps can be closed in order to avoid the person clearing them in the reverse direction, in expectation of a subsequent authorization.

In order to detect the entry of a person into entry zone ZA, if no movement is detected in the passageway according to direction B, the detection of a presence in front of at least the middle cell M1 (and high cell H1 in the case of an adult) of the first column when the following two cells M2 and M3 (and H2 and H3 respectively) are uncovered, initiates the detection of an entry into the entry zone. When the cells of the following columns M2 then M3 (and H2 then H3 respectively) are then successively covered and that finally those of the two first columns M1 then M2 (and H1 then H2 respectively) are successively uncovered and kept uncovered, the entry of a person is confirmed.

Similarly, for the detection of an exit from entry zone ZA, if no entry movement is in process, a presence on a middle cell M2 in the second column when that of the first is uncovered initiates the detection of an exit from the entry zone. As soon as there is no longer anybody in front of the two first columns the exit is confirmed.

A distinction is drawn between a person that may not enter into the gate and a person that may enter into the gate. Thus, if the gate is empty, i.e. nobody is detected in the passageway, the person can move forward in front of the first two columns of cells whereas if a passage is in process, nobody can enter into the gate, otherwise an anomaly is immediately signalled, so as to react more rapidly to a fraud or an intrusion.

When the flaps are not closed, and an entry is detected in the exit zone ZB, for example by the covering of the cell H12 or the cell M9, an “opposite direction” detection is initiated, i.e. it is verified that there is no movement in direction B, as only the clearing of the gate in direction A is authorized. If there is in fact an entry in the opposite direction, the flaps are closed.

When a person is detected in the zone ZA, without having been previously detected as having entered, it is considered that he has jumped into said zone, which is considered an intrusion, and treated as such.

Generally, an access ticket for an aeroplane is individual. Thus, a single gate-clearance authorization is delivered for each reading of a valid ticket. Such an authorization is delivered only if a preceding passage is finished, i.e. the previous person has left the gate.

The controls carried out when an authorization has thus been delivered will now be described.

When, after a given time, passage straight through the flaps has not been detected, or a fraud or an intrusion has been detected or if the gate is in closed mode (NF), the passage authorization is cancelled. The access ticket can then be returned to the ticket input slot.

In a “wait” position the gate, the flaps are closed. When passage authorization is given, the flaps are open. The authorization disappears as soon as the counting zone ZV is cleared, a closing “wait” delay time is engaged. At the end of the delay time, the flaps close again. An end-of-cycle delay time, of a few seconds, is activated.

The gate returns to the "wait" position only when no presence is detected in the exit zone or when an end-of-passage message is received.

If the passage is not finished before the end-of-cycle delay time has elapsed, this anomaly is signalled. The signalling of this anomaly remains active until a new passage authorization is given.

When a person leaves the passage, an end-of-passage delay time of a few tenthes of seconds is engaged. It is reset to zero if a presence is detected in the exit zone ZB before it expires. This delay time operates a filter so that backward arm movements are not taken as an intrusion in the opposite direction (B), when the passageway is being left.

As soon as passage is authorized, the flaps open. When the passage is cancelled, the authorization in process and those optionally stored are cancelled, the flaps close again and the gate returns to its "wait" position.

Passage cancellation can result from one of the two passage "wait" delay times here below or from an external data.

As a function of a presence in entry zone ZA, one of the following "wait" delay times is engaged:

- The entry "wait" delay time is engaged when a passage authorization is given and a person is not located in entry zone ZA. As soon as this person has cleared the flaps, the delay time is stopped and reinitialized when a new passage authorization is given.
- The passage "wait" delay time is engaged when a passage authorization is activated and the person is located in the entry zone. As soon as this person has cleared the flaps, the delay time is stopped and reinitialized when a new passage authorization is given.

As soon as passage is authorized, the flaps open. To the extent that they are not closed, if "Opposite-Direction Detection" is activated, i.e. a movement in the opposite direction is detected, the flaps close again.

If the person having caused the "Opposite-Direction Detection" has entered into the gate by the exit zone ZB and remains there, an "Opposite Direction Intrusion" is declared. If the person goes back and leaves the device, this state of intrusion is maintained for an intrusion maintenance delay time. If during this delay time, a new "Opposite-Direction Detection" occurs, it is treated as an "Opposite-Direction Intrusion" and the flaps are closed. Otherwise, at the end of the delay time, the state of intrusion disappears and the entry passage continues normally.

On the other hand, if the person clears the counting zone, the intrusion is changed to "Opposite-Direction Fraud". When there is no longer anybody in the gate, a fraud maintenance delay time is activated. At the end of the delay time, the entry passage continues normally.

As has been said above, ill-timed movements of the arms while leaving the passageway are filtered out. Otherwise, each time an arm went back into device, it would activate an "Opposite-Direction Detection".

Throughout the duration of the processing of the "Opposite-Direction Detection", the pictogram at the gate entry is in the shape of a red cross and a sound alarm is activated.

"Small Group After Authorized Passage Detection" occurs when an authorized person has cleared the flaps and the latter are closed or in closing phase and optionally the pictogram at the gate access prohibits entry, i.e. it is red and/or represents a cross.

To the extent that the non-authorized person having caused the "Small Group After Authorized Passage Detection" is in entry zone ZA, a "Small-Group Intrusion After Authorized Passage" is declared. If the non-authorized person goes back and leaves the device, this state of intrusion is maintained for an intrusion maintenance delay time. If during this delay time, a new "Small Group After Authorized Passage Detection" occurs, it is treated as a "Small-Group Intrision After Authorized Passage". At the end of the delay time, the state of intrusion disappears and the gate returns to its "wait" position.

On the other hand, if the non-authorized person clears the counting zone, the intrusion changes to "Small-Group Fraud". When there is no longer anybody in the gate, a fraud maintenance delay time is activated. At the end of the delay time, the state of intrusion disappears and the gate returns to its "wait" position.

Throughout the duration of the processing of the "Small-Group After Authorized Passage Detection", it can be advantageous to use a sound alarm.

"Small Group Before Authorized Passage Detection" occurs when an authorized person has not yet cleared the flaps. To the extent that the non-authorized person having caused the "Small Group Before Authorized Passage Detection" is located in the entry zone, a "Small-Group Before Authorized Passage Intrusion" is declared. If the non-authorized person goes back and leaves the device, this state of intrusion disappears and the processing of the passage of the authorized person continues normally.

On the other hand, if an authorized person is in the process of clearing the counting zone and the non-authorized person having caused the intrusion is in the entry zone, the device remains in this state of intrusion just when the passenger clears the counting zone or leaves the counting zone in order to go back towards the entry. At this moment, the "Small-Group Before Authorized Passage Intrusion" changes to a "Small-Group After Authorized Passage Intrusion". This phase serves only to prevent the passage of the authorized person from being interpreted as a "Small-Group After Authorized Passage Fraud".

Throughout the duration of the processing of the "Small-Group Before Authorized Passage Detection", the pictogram at the entry indicates that the passage is prohibited and the alarm sounds.

When the gate is in "wait" mode, in "controlled entry" mode, or in one of the closed modes, in either direction, i.e. the gate is unenergized, abnormal movements are controlled. Under these conditions no authorization is in process, the flaps are closed, and pictograms indicate that passing in each direction is prohibited.

The controls carried out when the gate is thus unenergized will now be described.

For entry zone ZA, the detection of an entry into the entry zone when the gate is unenergized is considered an "Unenergized-State Intrusion". Moreover, any presence in this zone not following an entry detection is considered "Unenergized-State Fraud". Thus, if a person tries to get out by jumping over the flaps, he lands in the entry zone and causes an "Unenergized-State Fraud". In fact, it is important that a passenger considered as having already boarded, cannot get out again. In fact, as has been said above, in order to limit the risk of terrorist attacks to suicide attempts, it is important to know who is actually in the aeroplane and that each piece of luggage in the hold does correspond to a passenger who has in fact boarded. When there is no longer anybody in the gate, the fraud maintenance delay time is activated. At the end of the delay time, the gate returns to its unenergized state.

If a non-authorized person enters into the entry zone, an "Unenergized-State Intrusion" is declared. If this person goes back and leaves the gate, this state of intrusion is maintained for the intrusion maintenance delay time. If during this delay time, a new entry into entry zone ZA occurs, it is treated as an "Unenergized-State Intrusion". At the end of the delay time, the state of intrusion disappears and the gate returns to its unenergized state.

On the other hand, if this same non-authorized person clears the counting zone, the intrusion changes to "Unenergized-State Fraud". When there is no longer anybody in the gate, the fraud maintenance delay time is activated. At the end of the delay time, the gate returns to its unenergized state.

Moreover, detection of an exit in the entry zone is also considered as an "Unenergized-State Intrusion".

For the exit zone ZB, any presence in this zone not following an entry detection is considered as "Unenergized-State Fraud". Thus, if a person tries to enter by jumping over the flaps, he lands in the exit zone and causes an "Unenergized-State Fraud".

If a person enters into the exit zone, an "Unenergized-State Intrusion" is declared. If he goes back and leaves the device, this state of intrusion is maintained for the intrusion maintenance delay time. If during this delay time, a new entry into the exit zone occurs, it is treated as an "Unenergized-State Intrusion". At the end of the delay time, the state of intrusion disappears and the gate returns to its unenergized state. On the other hand, if this same person clears the counting zone, the intrusion changes to an "Unenergized-State Fraud". When there is no longer anybody in the gate, the fraud maintenance delay time is activated. At the end of the delay time the gate returns to its unenergized state.

If a person is located in the exit zone ZB without there having been an entry detection, an "Unenergized-State Fraud" is declared. When there is no longer anybody in the gate, the fraud maintenance delay time is activated. At the end of the delay time the gate returns to its unenergized state.

For the crawling zone ZR, a presence in this zone causes an "Unenergized-State Fraud". When there is no longer anybody in the gate, the fraud maintenance delay time is activated. At the end of the delay time the gate returns to its unenergized state. If during the delay time, a new presence in the crawling zone is detected, it is again treated as Fraud.

The operation of the flaps will now be described.

When a passage management programme indicates a wish to open or close the flaps, it is ensured, by means of the safety zone ZS, that nothing can interfere with the movement of the flaps. Then a command is transmitted to the flap motors to move the flaps.

The flaps are each equipped with an opening end-of-travel sensor. They are declared open when the two opening ends-of-travel are reached. Similarly, they comprise two closing ends-of-travel. They are declared closed when the two closing ends-of-travel are reached.

Thus, when the flaps are closed, they will open only if the opening safety zone is empty. When the zone is free, an opening safety delay time is activated. At the end of the delay time, the opening command is sent to the motors. The flaps are designed so that they always have to open completely. When the flaps are completely open, a delay time is activated in order to allow a time lapse between the moment when the flaps are completely open and the moment when the automaton accepts any request to close. This delay time is provided only in order to allow the motors to stabilize a certain time before accepting a new closing request. An opening fault delay time exists. An opening fault is signalled when the opening fault delay time has elapsed and the opening ends-of-travels are not reached.

When a request to close occurs, if the flaps are not closed after a Complete Closing delay time has elapsed, the flaps reopen for a Closing Safety delay time then close again. This process is applied indefinitely if the flaps never close again. After five movements, a technical alarm is generated and the gate is blocked, by default, in both directions. This technical fault remains signalled to the extent that the closing ends-of-travel are not reached. As soon as the fault is signalled, the motorization is kept active until the closing end-of-travel is reached.

To the extent that the flaps are not completely closed, they reopen completely as soon as a presence is detected in the safety zone ZS. A closing control is then activated after a Closing Safety "Wait" delay time.

The closing safety zone is activated for an Activated Safety delay time which is itself engaged during a request for closing the flaps. If anything prevents the flaps from closing completely, after the Safety delay time has been activated, they close again unconditionally. Once closed, the safety zone is deactivated.

According to the same principle, it can be envisaged that when the gate is unenergized, if the flaps are closed and they are forced, they close again automatically.

By default it can be envisaged that the Activated Safety delay time keeps the safety zone ZS permanently activated.

The embodiment of the gate illustrated in FIG. 31 will now be described, in that it differs from that in FIG. 30, the operation of which has just been described previously.

The embodiment of FIG. 31 comprises only one flap 3, mobile in a plane situated between the sixth and seventh columns of cells. Moreover, it comprises three additional cells M10, M11, M12 in the middle row in line with the tenth, eleventh and twelfth columns of cells, in the exit zone ZB. These additional cells are useful for detecting the presence of a trolley or a child in the exit zone ZB and in order to differentiate between passenger and luggage. Moreover, they are intended particularly for processing a "Small Group after Clearance of the Flap" fraud (or flaps in an embodiment comprising two flaps).

Other additional cells B5, B6 are arranged in the low row, in line with the fifth and sixth columns, i.e. before the flap in direction A. These two cells allow better detection of a trolley or a wheeled suitcase, and reduce the risk that the flap closes again above, whilst the trolley has not completely cleared it. Moreover they will complete the crawling zone ZR.

Thus, a safety zone for a trolley ZC can comprise the cells M5, M6, M7 and B5, and the cells L5 and L6 when these are present.

Of course the invention is not limited to the examples which have just been described and numerous adjustments can be made to these examples without exceeding the scope the invention.

In particular, the number of cells in each line can be smaller or greater, according to the type of detection which is to be carried out. For example if only the passage is to be controlled, and the number of persons having effectively passed the flaps counted, the cells in the zone of the flaps ZV are sufficient.

Similarly, the spacing of the columns, the position of the rows relative to the ground and their spacing, can vary as a function of anthropometric data relative to a population to be controlled.

It can also be envisaged that the gate is completely symmetrical, particularly if it is to be possible to use it, carrying out the same controls, in two opposite directions. In this case, according to the direction of the passage, certain cells cannot be used for the controls.

The sound alarm can be different according to whether an intrusion or a fraud is detected. The gate can also be designed not to differentiate between intrusion and fraud.

A distinction can be drawn between an opening safety zone and a closing safety zone. Thus, in the embodiment of FIG. 31, the opening safety zone can be constituted by the cells H6 and M6, and in the embodiment of FIG. 30 can moreover include the cells H7 and M7. The opening safety zone, which is more restrictive, can comprise, in the embodiment of FIG. 31, the cells H6, H7, M6, M7, B6 and B7.

Instead of a ticket of the type with a magnetic strip, the transport ticket can in particular be of a type for contactless reading, in particular using radio frequencies. The ticket can also comprise a barcode and the gate can comprise a printer for printing a boarding pass.

The detection can be carried out by means other than the covering of photo-electric cells.

The invention claimed is:

1. An automatic gate for permitting or preventing access by a person to a space or a transport vehicle, comprising: at least one vertical and elongated frame; at least one flap which is mobile between a closed position in which said at least one flap forms a barrier preventing passage of a person along the frame, and an open position in which the at least one flap allows the passage of a person along the frame; elements for reading an access ticket; elements for controlling the displacement of the at least one flap between the two abovementioned positions; a lateral face of the frame adjacent to the passage of the person comprising at least two superposed rows of detection cells cooperating with elements for preventing the opening of the flap or for maintaining the flap closed when said detection cells detect an abnormal situation, one of the at least two superposed rows, called high or upper row, includes a plurality of said detection cells extending to upstream and downstream sides of the at least one flap above a line situated at the mid-height of the frame, and the other row called middle row, being situated close to said line, wherein the detection cells in at least one of the upper and middle rows, situated downstream of the flap are configured for detecting a change of direction of a person or of a child that has passed the flap and for controlling the closing of the flap in order to prevent the person from turning back.

2. Automatic gate according to claim 1, characterized in that it comprises moreover a third row, called low, of at least one cell situated below line (L).

3. Gate according to claim 2, characterized in that the low row comprises a cell immediately downstream of the flap.

4. Gate according to claim 3, characterized in that each cell of the low row is arranged under a cell of the middle row.

5. Gate according to claim 2, characterized in that the low row comprises two cells immediately upstream of the flap.

6. Automatic gate according to claim 1 for permitting or preventing access by a person to a space or a transport vehicle, in particular to a boarding lounge or an aeroplane, comprising at least one vertical and elongated frame constituting a closed box, the gate comprising, at least one flap which is mobile between a closed position in which this flap forms a barrier preventing the passage of a person along the frame and an open position in which the flap allows this passage, the end upstream of the frame relative to the person's direction of movement, comprising an input slot for an access ticket and the end downstream of the frame comprising an output slot for this ticket, the frame including elements for controlling the displacement of the flap between the two abovementioned positions, a route for displacement of the ticket between the input slot and the output slot for the ticket and elements for reading the ticket, characterized in that it comprises elements for preventing the person from accessing the output slot in order to remove the ticket, when the flap is in the position preventing the passage of the person, the distance between the flap and the output of the ticket is such that when the flap is in the position preventing the passage of a person, the latter cannot access the ticket output in order to remove the ticket.

7. Automatic gate according to claim 1, characterized in that the flap (3) is integral with the frame (2).

8. Automatic gate according to claim 1, characterized in that the flap (3) is mounted in rotation about an approximately horizontal axis (X-X') extending in the direction of the length of the frame (2).

9. Automatic gate according to claim 1, characterized in that in the position preventing the passage of the person, the flap (3) has a part projecting out of the frame (2) having the shape of a sector of a circle, the circular edge (3*a*) of this sector being directed upwards.

10. Automatic gate according to claim 1, characterized in that the elements for controlling the displacement of the flap (3) are constituted by the reading of a valid ticket, allowing the displacement of the flap.

11. Automatic gate according to claim 1, wherein the cells comprise at least three groups of cells, each of these groups being assigned to different detection functions, a first group of said cells is assigned to a detection function ensuring the person's safety, a second group of said cells is assigned to a detection function in order to allow counting of the persons and a third group of said cells is assigned to a function of detection of non-authorized and/or fraudulent passages, at least one cell can belong simultaneously to two groups of said cells in order to perform different functions depending on the group of said cells to which the cell is assigned.

12. Automatic gate according to claim 1, wherein the cells in the upper row comprised between the frame entry end and the flap are suitable for detecting the entry of an adult and optionally of two or more persons in close proximity, the cells in the middle row comprised between the flap and the frame exit end are suitable for detecting the exit of a person after the opening of the flap, the cells in the lower row comprised between the frame entry end and the flap are suitable for detecting the entry of a child, the detection of an adult pulling a trolley is carried out by the combination of at least one covered cell in the upper row simultaneously with the covering of at least two covered cells in the lower row, separated by a non-covered cell, the cells situated close to the flap are assigned to the safety of the person vis-à-vis the ill-timed closing of the flap.

13. Automatic gate according to claim 1, wherein the frame contains a microcomputer suitable for receiving information from an external central control station, a reader for the ticket introduced into the input slot of the frame, cells for detection and in order to control, via an automaton and a frequency variator, the operation of an electric motor for displacing the flap towards the opening or closing positions, the ticket has a magnetic strip, the frame comprising elements for reading this magnetic strip capable of reading the latter, whatever the position in which the ticket is introduced into the input.

14. Automatic gate according to claim 1, characterized in that the frame (2) also comprises close to the ticket output (5), a module (20) for cutting the ticket and detaching from the latter a coupon (21) intended to be taken by the person, and a store (50, 51) for recovering the remaining part of the ticket.

15. Automatic gate according to claim 14, characterized in that the frame (2) comprises between the displacement route (6) of the ticket and the module (20) for cutting the ticket, a module (24) for turning the latter over.

16. Automatic gate according to claim 1, characterized in that the frame (2) contains a printer for printing a second ticket different from the ticket read by the reading elements, this printer being controlled as a function of the data read by a reader and information received from an external control station (9).

17. Automatic gate according to claim 1, characterized in that the frame (2) comprises a second flap mounted in pivoting fashion inside the frame, close to the first flap (3), on an axis (X-X') shared with the latter, this flap projecting in the closed position, from the face of the frame (2) opposite to that from which the first flap (3) projects when it is in the closed position.

18. Automatic gate according to claim 1, characterized in that the gate comprises a second frame (2*c*) parallel to the first and delimiting the passage, the second frame comprises a second flap (3*b*) cooperating with the first flap, the opening of the first and second flaps being controlled by the reading of a valid ticket and the elements associated with the opening of the passage.

19. Automatic gate according to claim 1, characterized in that it comprises a sound or visual signal associated with each normal or abnormal passage situation.

20. Automatic gate according to claim 1, characterized in that it has a symmetrical architecture suitable for allowing passage either in one direction, or in the opposite direction.

21. Gate according to claim 1, characterized in that the high row comprises at least six cells (H1-H6) upstream of the flap.

22. Gate according to claim 1, characterized in that the high row comprises at least six cells (H7-H12) downstream of the flap.

23. Gate according to claim 1, characterized in that the middle row comprises at least six cells (M1-M6) upstream of the flap.

24. Gate according to claim 23, characterized in that each cell of the middle row is arranged under a cell of the high row.

25. Gate according to claim 1, characterized in that the middle row comprises at least three cells (M7-M9) downstream of the flap.

26. Gate according to claim 25, characterized in that the middle row comprises at least six cells (M7-M12) downstream of the flap.

27. Gate according to claim 1, characterized in that it comprises another flap arranged downstream of the flap, so that a high cell and/or a middle cell is located between the two flaps.

28. The automatic gate according to claim 1, wherein the middle row is below the line situated at the mid-height of the frame.

29. The automatic gate according to claim 1, wherein the detection cells in the upper and middle rows, situated downstream of the at least one flap detect the passage of a person or of a child from downstream to upstream of the gate and close the at least one flap in order to prevent the person from turning back.

30. Method of controlling access for an automatic gate comprising at least one vertical and elongated frame, at least one flap which is mobile between a closed position in which the flap forms a barrier preventing passage of a person along the frame and an open position in which the flap allows this passage, elements for reading an access ticket, elements for controlling displacement of the flap between the two positions, a lateral face of the frame adjacent to the passage of the person comprising at least two superposed rows of detection cells cooperating with elements for preventing opening of the flap or for maintaining the flap closed when these cells detect an abnormal situation, one of the rows called a high or upper row, comprising a plurality of the detection cells extending to both sides of the flap, above a line situated at the mid height of the frame and the other row called middle, being situated closest to the line, and a third row called low, of at least one cell situated below the line, method comprising steps of: determining the presence of an adult by the simultaneous covering of a cell of the high row and a cell of the middle row superposed on the cell of the high row; detecting the presence of a child by the covering of a cell of the middle row without a cell of the high row, superposed on the cell of the middle row being covered; detecting a fraud by crawling when only one of the cells of the low row is covered, and detecting a fraud and or an intrusion when a number of consecutive cells, in the same row covered simultaneously, is greater than a given number; and detecting a change of direction of a person or of a child that has passed the flap using the cells in the upper or middle rows that are situated downstream of the flap, and controlling the closing of the flap in order to prevent the person from turning back.

31. Method of controlling access for an automatic gate according to claim 30, characterized in that the entry of a person into the gate is determined when the most upstream middle cell (M1), and most upstream high cell (H1) in the case of an adult, is covered at the same time as the following two cells (M2, M3) (H2 and H3 respectively ) are uncovered and that then the cells of the following columns (M2 then M3 and H2 then H3 respectively) are successively covered and that finally those of the two first columns (M1 then M2 and Hi then H2 respectively) are successively uncovered.

32. Method of controlling access for an automatic gate according to claim 30, characterized in that the gate comprises an almost ready state, allowing the advanced reading of an access ticket.

33. Method of controlling access according to claim 32, characterized in that if the gate is not ready after a given time, and an access ticket has been introduced via the ticket input slot, the ticket is returned by the ticket input slot.

34. Method of controlling access for an automatic gate according to claim 30, characterized in that if after a given time following an authorization of clearing the gate, the flap or flaps have not been cleared, the authorization is cancelled and the flaps closed.

35. Method of controlling access according to claim 34, characterized in that moreover if an access ticket has been introduced via a ticket input slot, the ticket is returned by the ticket input slot.

36. Method of controlling access for an automatic gate according to claim 30, characterized in that when an intrusion and/or when a fraud is detected, if the flap or flaps are open, they receive a command to close and/or a message is sent to a host system.

37. Method of controlling access for an automatic gate according to claim 36, characterized in that, following the intrusion, the flap or flaps are reopened only after a given time.

38. Method of controlling access for an automatic gate according to claim 30, characterized in that when an intrusion or a fraud is detected, it is signaled by a sound signal and/or a light signal which signals that access to the gate is forbidden.

39. Method of controlling access for an automatic gate according to claim 30, characterized in that it comprises an evacuation mode, which can be activated locally, in which the gate is held open in order to allow free circulation.

40. Method of controlling access for an automatic gate according to claim 30, characterized in that it comprises a normally open mode in which the flap is open and unenergized and closes in case of intrusion and/or fraud.

41. Method of controlling access for an automatic gate according to claim 30, characterized in that it comprises a normally closed mode in which the flap is closed and unenergized and opens in case of authorized passage.

42. Method of controlling access for an automatic gate according to claim 30, characterized in that a zone of cells to both sides of the flap allows validation of their clearing by a person.

43. Method of controlling access for an automatic gate according to claim 30, characterized in that a zone of cells for counting is composed of three successive columns of cells, each column of cells being successively covered then successively uncovered before validation of a passage.

44. Method of controlling access for an automatic gate according to claim 30, characterized in that a delay time exists which is engaged after at least certain of the clearing stages of the gate, an anomaly being detected if a following clearing stage of the gate has not occurred during this delay time.

45. Method of controlling access for a automatic gate according to claim 44, characterized in that a delay time exists for the entry of a person into the gate after an authorization has been given to him.

46. Method of controlling access for an automatic gate according to claim 44, characterized in that a delay time exists for clearing the flap or flaps by an authorized person after he has entered into the gate entry zone.

47. Method of controlling access for an automatic gate according to claim 44, characterized in that a delay time exists for a person to leave the exit zone, after having cleared the flaps.

48. The method of controlling access for an automatic gate according to claim 30, comprising detecting the passage of a person or of a child from downstream to upstream of the gate using the cells of the upper and middle rows that are situated downstream of the flap, and controlling the closing of the flap in order to prevent the person from turning back.

49. Automatic gate for permitting or preventing access by a person to a space or a transport vehicle, comprising: at least one vertical and elongated frame constituting a closed box; at least one flap which is mobile between a closed position in which said flap forms a barrier preventing the passage of a person along the frame and an open position in which the flap allows passage; an end upstream of the frame relative to the person's direction of movement, comprising an input slot for an access ticket and another end downstream of the frame comprising an output slot for the ticket, the frame including elements for controlling the displacement of the flap between the two abovementioned positions, a route for displacement of the ticket between the input slot and the output slot for the ticket and elements for reading the ticket, wherein the gate is structured and arranged for preventing the person from accessing the output slot in order to remove the ticket, when the flap is in the position preventing the passage of the person, by the distance between the flap and the output of the ticket being such that the person cannot access the ticket output in order to remove the ticket, and wherein the gate includes a plurality of detection cells situated downstream of the flap configured for detecting a change of direction of a person or of a child that has passed the flap and for controlling the closing of the flap in order to prevent the person from turning back.

* * * * *

UNITED STATES PATENT AND TRADEMARK OFFICE
CERTIFICATE OF CORRECTION

PATENT NO. : 7,617,974 B2
APPLICATION NO. : 10/541326
DATED : November 17, 2009
INVENTOR(S) : Vandyck et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 138 days.

Signed and Sealed this

Fourteenth Day of December, 2010

David J. Kappos
*Director of the United States Patent and Trademark Office*